(12) United States Patent
Kadotani et al.

(10) Patent No.: US 11,811,974 B2
(45) Date of Patent: Nov. 7, 2023

(54) LIGHT SOURCE DEVICE, PROJECTOR, AND COOLING PLATE

(71) Applicant: SEIKO EPSON CORPORATION, Tokyo (JP)

(72) Inventors: Masato Kadotani, Matsumoto (JP); Shohei Shimoma, Matsumoto (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 17/865,646

(22) Filed: Jul. 15, 2022

(65) Prior Publication Data
US 2023/0012956 A1 Jan. 19, 2023

(30) Foreign Application Priority Data
Jul. 16, 2021 (JP) ................. 2021-118274

(51) Int. Cl.
G03B 21/16 (2006.01)
F21V 29/56 (2015.01)
H04N 9/31 (2006.01)
F21V 29/77 (2015.01)

(52) U.S. Cl.
CPC .......... *H04N 9/3144* (2013.01); *F21V 29/56* (2015.01); *F21V 29/773* (2015.01); *H04N 9/3164* (2013.01)

(58) Field of Classification Search
CPC ...... G03B 21/16; H04N 9/3144; F21V 29/56; F21V 29/57; F21V 29/59; F21V 29/763; F21V 29/76; F21V 29/767
See application file for complete search history.

(56) References Cited

U.S. PATENT DOCUMENTS
2019/0121225 A1    4/2019 Suzuki et al.

FOREIGN PATENT DOCUMENTS
CN          113015400 A  *  6/2021   ......... H05K 7/20254
JP          2017058120 A  *  3/2017
JP          2020-079950 A     5/2020

* cited by examiner

*Primary Examiner* — Ryan D Howard
(74) *Attorney, Agent, or Firm* — Dority & Manning, P.A.

(57) ABSTRACT

A light source device includes a light source module, a plurality of heat receiving plates coupled to the light source module, and a cooling plate coupled to the plurality of heat receiving plates, cooling liquid flowing on the inside of the cooling plate. The cooling plate includes an upstream-side flowing section, a downstream-side flowing section, and a plurality of heat transfer sections provided in at least one of the upstream-side flowing section and the downstream-side flowing section and aligned in a second direction. The plurality of heat transfer sections include a plurality of fins extending in the second direction and a plurality of channels provided among the plurality of fins. The plurality of heat receiving plates are disposed along the second direction. The plurality of heat transfer sections are separated from one another in positions among the plurality of heat receiving plates in the second direction.

16 Claims, 14 Drawing Sheets

LIGHT SOURCE DEVICE, PROJECTOR, AND COOLING PLATE

The present application is based on, and claims priority from JP Application Serial Number 2021-118274, filed Jul. 16, 2021, the disclosure of which is hereby incorporated by reference herein in its entirety.

BACKGROUND

1. Technical Field

The present disclosure relates to a light source device, a projector, and a cooling plate.

2. Related Art

There has been known a projector including a light source device including a plurality of solid-state light sources (see, for example, JP-A-2020-79950 (Patent Literature 1)).

In the projector described in Patent Literature 1, the light source device includes a first light source and a second light source. Each of the first light source and the second light source includes a light source array and a light-source cooling section that cools the light source array. The light source array includes a plurality of light source modules. The plurality of light source modules are disposed side by side in the latitudinal direction of one light source module. Each of the plurality of light source modules includes a plurality of solid-state light sources arrayed vertically and horizontally and a supporting section that supports the plurality of solid-state light sources and is fixed to the light-source cooling section.

The light-source cooling section includes a first member to which the light source array is fixed and a second member disposed on the opposite side of the light source array with respect to the first member. The light-source cooling section is configured by combining the first member and the second member.

The first member includes a plurality of attaching sections to which the plurality of light source modules are attached. The first member includes a first fin and a second fin on the opposite side of a surface on which the plurality of attaching sections are provided. When the first member and the second member are combined, the first fin and the second fin configure a part of a channel in which a liquid coolant flows.

The liquid coolant flows among a plurality of fin elements forming the first fin and among a plurality of fin elements forming the second fin. Specifically, the liquid coolant having flowed into the inside of the light-source cooling section via an inflow section is divided into a liquid coolant flowing on the first fin side and a liquid coolant flowing on the second fin side. The liquid coolant flowing on the first fin side flows among the plurality of fin elements included in the first fin while reversing a flowing direction a plurality of times. Similarly, the liquid coolant flowing on the second fin side flows among the plurality of fin elements included in the second fin while reversing a flowing direction a plurality of times. The liquid coolant having flowed on the first fin side and the liquid coolant having flowed on the second fin side are discharged to the outside of the light-source cooling section via an outflow section. That is, the light-source cooling section includes a meandering channel in which the liquid coolant flows from the inflow section toward the outflow section.

However, in the light source device described in Patent Literature 1, since the dimension of the fin elements is relatively long in an extending direction of the fin elements, a pressure loss of cooling liquid is large. In the light-source cooling section that divides the liquid coolant having flowed in from the inflow section and flows the liquid coolant to the first fin and the second fin, a pressure loss increases before the liquid coolant reaches among the plurality of fin elements included in the first fin and the plurality of fin elements included in the second fin.

To solve such a problem, it is conceivable to adopt a large pump as a pump that supplies the liquid coolant to the light-source cooling section. However, in this case, a cooling device increases in size and, therefore, a projector increases in size.

Accordingly, there has been a demand for another component that can efficiently cool a cooling target.

SUMMARY

A light source device according to a first aspect of the present disclosure includes: a light source module including a plurality of substrates on which light emitting elements are disposed; a plurality of heat receiving plates coupled to the light source module; and a cooling plate coupled to each of the plurality of heat receiving plates, cooling liquid flowing on an inside of the cooling plate. The cooling plate includes: an inflow section provided in a part in a first direction extending along an end portion, the cooling liquid flowing into the inflow section; an outflow section provided in a part in an opposite direction of the first direction with respect to the part, the cooling liquid flowing out from the outflow section; an upstream-side flowing section in which the cooling liquid having flowed in from the inflow section flows in a second direction orthogonal to the first direction; a downstream-side flowing section in which the cooling liquid having flowed in the upstream-side flowing section flows in an opposite direction of the second direction; and a plurality of heat transfer sections provided in at least one flowing section of the upstream-side flowing section and the downstream-side flowing section and disposed side by side in the second direction. The plurality of heat transfer sections include: a plurality of fins extending along the second direction and arrayed along the first direction; and a plurality of channels provided among the plurality of fins, the cooling liquid flowing in the plurality of channels. The plurality of heat receiving plates are disposed along the second direction to correspond to the at least one flowing section. The plurality of heat transfer sections are separated from one another in positions corresponding to positions among the plurality of heat receiving plates in the second direction.

A light source device according to a second aspect of the present disclosure includes: a light source module including a plurality of substrates on which light emitting elements are disposed; one heat receiving plate coupled to the light source module; and a cooling plate coupled to the heat receiving plate, cooling liquid flowing on an inside of the cooling plate. The cooling plate includes: an inflow section provided in a part in a first direction extending along an end portion, the cooling liquid flowing into the inflow section; an outflow section provided in a part in an opposite direction of the first direction with respect to the part, the cooling liquid flowing out from the outflow section; an upstream-side flowing section in which the cooling liquid having flowed in from the inflow section flows in a second direction orthogonal to the first direction; a downstream-side flowing section in which the cooling liquid having flowed in the upstream-side flowing section flows in an opposite direction of the second direction; and a plurality of heat transfer sections provided in at least one flowing section of the upstream-side flowing section and the downstream-side flowing section and disposed side by side in the second direction. The plurality of heat transfer sections include: a plurality of fins extending along the second direction and arrayed along the first direction; and a plurality of channels provided among the plurality of fins, the cooling liquid flowing in the plurality of channels. The plurality of substrates are disposed side by side in the second direction. The plurality of heat transfer sections are separated from each other in a position corresponding to a position between two light emitting elements among a plurality of the light emitting elements aligned in the second direction.

A light source device according to a third aspect of the present disclosure includes: a light source module including a plurality of substrates on which light emitting elements are disposed; a plurality of heat receiving plates coupled to the light source module; and a cooling plate coupled to each of the plurality of heat receiving plates, cooling liquid flowing on an inside of the cooling plate. The cooling plate includes: an inflow section provided in a part in a first direction extending along an end portion, the cooling liquid flowing into the inflow section; an outflow section provided in a part in an opposite direction of the first direction with respect to the part, the cooling liquid flowing out from the outflow section; an upstream-side flowing section in which the cooling liquid having flowed in from the inflow section flows in a second direction orthogonal to the first direction; a downstream-side flowing section in which the cooling liquid having flowed in the upstream-side flowing section flows in an opposite direction of the second direction; and a plurality of heat transfer sections provided in at least one flowing section of the upstream-side flowing section and the downstream-side flowing section and provided along the second direction. The plurality of heat transfer sections include: a plurality of fins extending along the second direction and arrayed along the first direction; and a plurality of channels provided among the plurality of fins, the cooling liquid flowing in the plurality of channels. The plurality of heat receiving plates include: an upstream-side heat receiving plate provided to correspond to the upstream-side flowing section; and a downstream-side heat receiving plate provided to correspond to the downstream-side flowing section. The plurality of substrates include: a plurality of upstream-side substrates disposed side by side in the second direction and coupled to the upstream-side heat receiving plate; and a plurality of downstream-side substrates disposed side by side in the second direction and coupled to the downstream-side heat receiving plate. The plurality of heat transfer sections are separated from each other in a position corresponding to a position between two light emitting elements among a plurality of the light emitting elements aligned in the second direction.

A projector according to a fourth aspect of the present disclosure includes: the light source device according to one of the first aspect to the third aspect; an image forming device configured to modulate light emitted from the light source device to form image light; and a projection optical device configured to project the image light formed by the image forming device.

A cooling plate according to a fifth aspect of the present disclosure is a cooling plate, on an inside of which cooling liquid flows, the cooling plate including: an inflow section provided in a part in a first direction extending along an end portion, the cooling liquid flowing into the inflow section; an outflow section provided in a part in an opposite direction of the first direction with respect to the part, the cooling liquid flowing out from the outflow section; an upstream-side flowing section in which the cooling liquid having flowed in from the inflow section flows in a second direction orthogonal to the first direction; a downstream-side flowing section in which the cooling liquid having flowed in the upstream-side flowing section flows in an opposite direction of the second direction; and a plurality of heat transfer sections provided in at least one flowing section of the upstream-side flowing section and the downstream-side flowing section and disposed side by side in the second direction. The plurality of heat transfer sections include: a plurality of fins extending along the second direction and arrayed along the first direction; and a plurality of channels provided among the plurality of fins, the cooling liquid flowing in the plurality of channels. The plurality of heat transfer sections are separated from one another in the second direction.

DESCRIPTION OF EXEMPLARY EMBODIMENTS

First Embodiment

Figure 1:
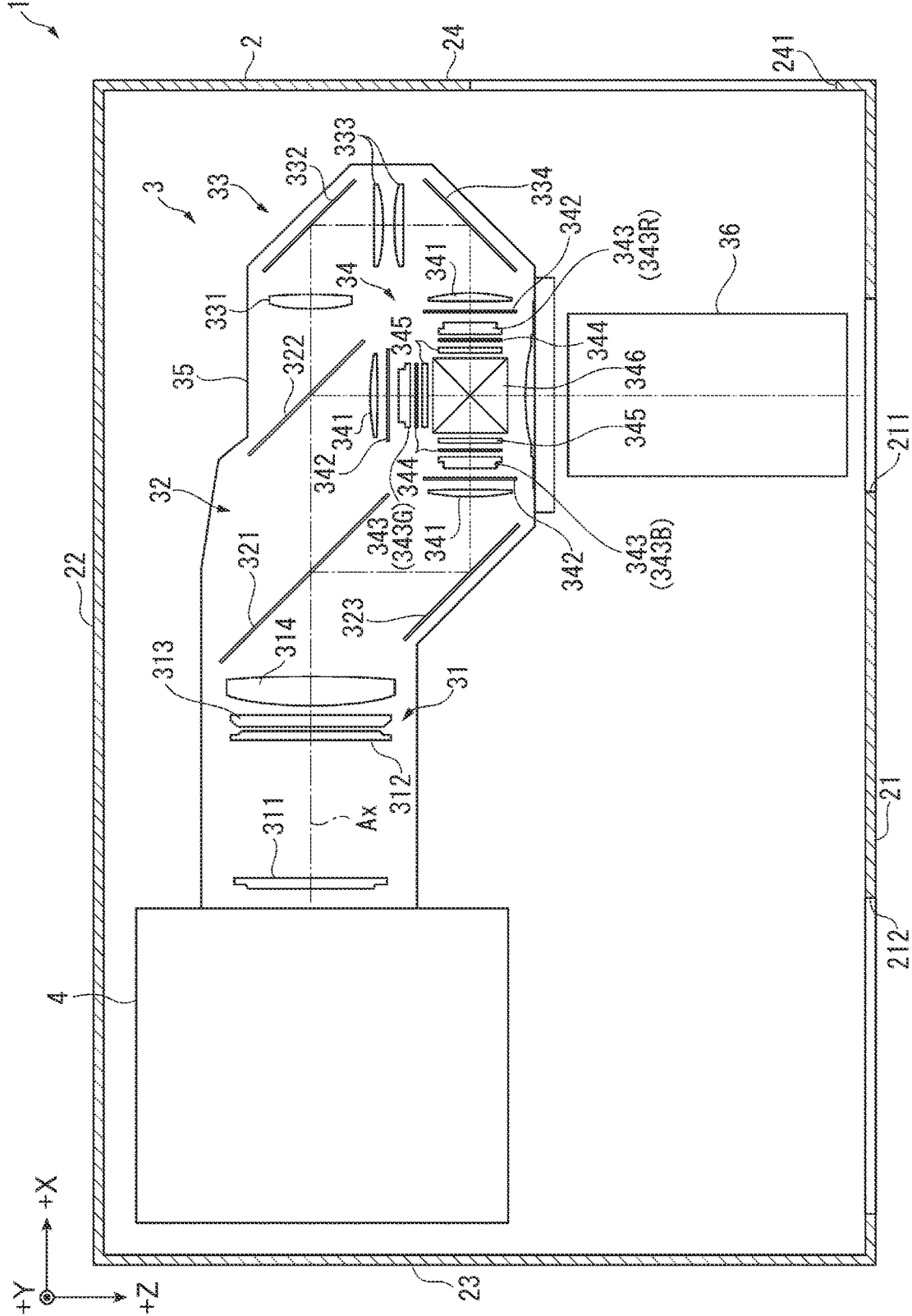
FIG. 1 is a schematic diagram showing the configuration of a projector according to a first embodiment.

A first embodiment of the present disclosure is explained below with reference to the drawings.
Schematic Configuration of a Projector FIG. 1 is a schematic diagram showing the configuration of a projector 1 according to this embodiment.

The projector 1 according to this embodiment modulates light emitted from a light source device 4 to form an image corresponding to image information and enlarges and projects the formed image onto a projection surface such as a screen. The projector 1 includes, as shown in FIG. 1, an exterior housing 2 and an image projection device 3. Besides, although not illustrated, the projector 1 includes a light source device that supplies electric power to electronic components configuring the projector 1, a control device that controls the operation of the projector 1, and a cooling device that cools cooling targets configuring the projector 1.

The cooling device includes a circulation channel in which cooling liquid flowing to a first cooling plate 615 and a second cooling plate 625 (see FIG. 3) explained below circulates. Specifically, the cooling device includes a tank that stores the cooling liquid, a radiator that cools the cooling liquid, a pump that pressure-feeds the cooling liquid, and a plurality of pipes. The plurality of pipes couple the tank, the radiator, the pump, the first cooling plate 615, and the second cooling plate 625 to enable the cooling liquid to flow.

Configuration of an Exterior Housing

An exterior housing 2 configures the exterior of the projector 1 and houses the image projection device 3, the power supply device, the control device, and the cooling device on the inside.

The exterior housing 2 includes a front surface section 21, a rear surface section 22, a left side surface section 23, and a right side surface section 24. Although not illustrated, the exterior housing 2 includes a top surface section coupling one end portions in the surface sections 21 to 24 and a bottom surface section coupling other end portions in the surface sections 21 to 24. The exterior housing 2 is formed in, for example, a substantially rectangular parallelepiped shape.

The right side surface section 24 includes an introducing port 241. The introducing port 241 introduces air on the outside of the exterior housing 2 into the inside of the exterior housing 2. A filter that collects dust included in the air passing through the introducing port 241 may be provided in the introducing port 241.

The front surface section 21 includes a passage port 211 located substantially in the center in the front surface section 21. Light projected from a projection optical device 36 explained below passes through the passage port 211.

The front surface section 21 includes an exhaust port 212 located on the left side surface section 23 side in the front surface section 21. The exhaust port 212 discharges the air having cooled the cooling targets provided in the exterior housing 2 to the outside of the exterior housing 2.

In the following explanation, three directions orthogonal to one another are represented as a +X direction, a +Y direction, and a +Z direction. The +X direction is a direction from the left side surface section 23 toward the right side surface section 24. The +X direction is along a direction in which the light source device 4 explained below emits illumination light to a uniformizing device 31. The +Y direction is a direction from the bottom surface section toward the top surface section. The +Z direction is a direction from the rear surface section 22 toward the front surface section 21. When viewed from the +Y direction, the +Z direction is along a direction in which the projection optical device 36 explained below projects image light. Although not illustrated, the opposite direction of the +X direction is represented as a −X direction, the opposite direction of the +Y direction is represented as a −Y direction, and the opposite direction of the +Z direction is represented as a −Z direction.

Configuration of the Image Projection Device

The image projection device 3 forms an image corresponding to image information input from the control device and projects the formed image. The image projection device 3 includes a light source device 4, a uniformizing device 31, a color separation device 32, a relay device 33, an image forming device 34, an optical component housing 35, and a projection optical device 36.

The configuration of the light source device 4 is explained in detail below.

The uniformizing device 31 uniformizes light emitted from the light source device 4. The uniformized light illuminates modulation regions of light modulation devices 343 explained below through the color separation device 32 and the relay device 33. The uniformizing device 31 includes two lens arrays 311 and 312, a polarization conversion element 313, and a superimposing lens 314.

The color separation device 32 separates light made incident from the uniformizing device 31 into red, green, and blue lights. The color separation device 32 includes two dichroic mirrors 321 and 322 and a reflection mirror 323 that reflects the blue light separated by the dichroic mirror 321.

The relay device 33 is provided in an optical path of the red light longer than optical paths of the other color lights and prevents a loss of the red light. The relay device 33 includes an incident side lens 331, a relay lens 333, and reflection mirrors 332 and 334. In this embodiment, the relay device 33 is provided on the optical path of the red light. However, not only this, but color light having an optical path longer than the optical paths of the other color lights may be the blue light. The relay device 33 may be provided on the optical path of the blue light.

The image forming device 34 modulates the red, green, and blue lights made incident thereon and combines the modulated color lights to form image light. That is, the image forming device 34 modulates light emitted from the light source device 4 to form image light. The image forming device 34 includes three field lenses 341, three incident-side polarization plates 342, three light modulation devices 343, three viewing angle compensation plates 344, and three emission-side polarization plates 345 provided to correspond to the color lights made incident thereon and one color combining section 346.

The light modulation devices 343 modulate the light emitted from the light source device 4 according to image information. The three light modulation devices 343 include a light modulation device 343R that modulates the red light, a light modulation device 343G that modulates the green light, and a light modulation device 343B that modulates the blue light. The light modulation devices 343 are configured by a transmission-type liquid crystal panel. A liquid crystal light valve is configured by the incident-side polarization plates 342, the light modulation devices 343, and the emission-side polarization plate 345.

The color combining section 346 combines the three color lights modulated by the light modulation devices 343B, 343G, and 343R to form image light and emits the formed image light to the projection optical device 36. In this embodiment, the color combining section 346 is configured by a cross-dichroic prism. However, not only this, but the color combining section 346 can also be configured by a plurality of dichroic mirrors.

The optical component housing 35 houses the devices 31 to 34 explained above on the inside. An illumination optical axis Ax, which is an optical axis in design, is set in the image projection device 3. The optical component housing 35 holds the devices 31 to 34 in predetermined positions on the illumination optical axis Ax. The light source device 4 and the projection optical device 36 are disposed in predetermined positions on the illumination optical axis Ax.

The projection optical device 36 is a projection lens that enlarges and projects image light made incident from the image forming device 34 onto the projection surface. That is, the projection optical device 36 projects the image light formed by the image forming device 34. As the projection optical device 36, a group lens including a plurality of lenses and a tubular lens barrel, on the inside of which the plurality of lenses are housed, can be illustrated.

Configuration of the Light Source Device

Figure 2:
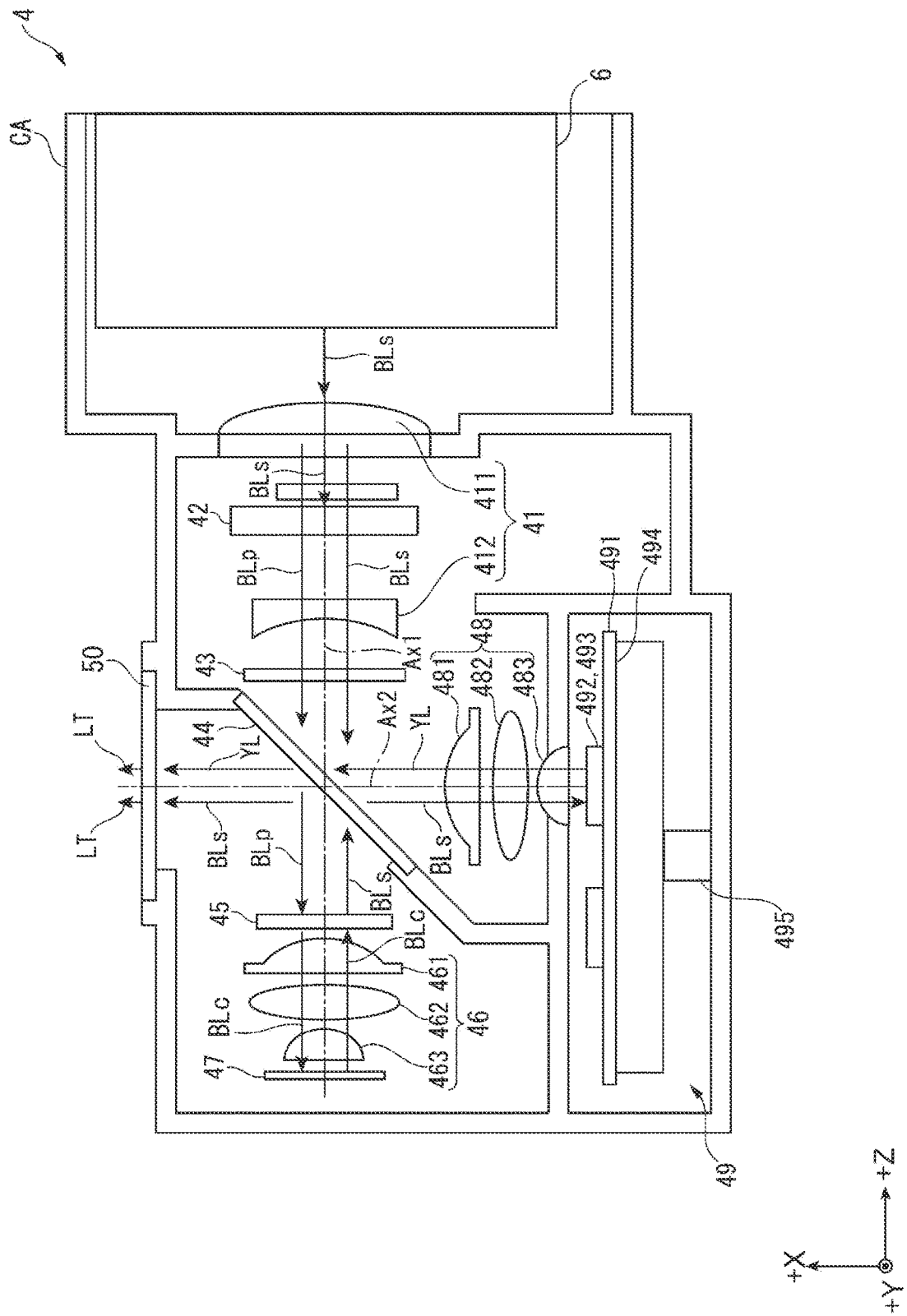
FIG. 2 is a schematic diagram showing the configuration of a light source device according to the first embodiment.

FIG. 2 is a schematic diagram showing the light source device 4.

The light source device 4 emits illumination light for illuminating the image forming device 34 to the uniformizing device 31. The light source device 4 includes, as shown in FIG. 2, a light source housing CA, an afocal optical element 41, a first phase difference element 42, a diffusion transmission element 43, a light separation combination element 44, a second phase difference element 45, a first condensing element 46, a diffusion optical element 47, a second condensing element 48, a wavelength conversion element 49, a third phase difference element 50, and a light source section 6.

In the light source device 4, an illumination optical axis Ax1 linearly extending along the −Z direction and an illumination optical axis Ax2 orthogonal to the illumination optical axis Ax1 and linearly extending along the +X direction are set.

The light source section 6, the afocal optical element 41, the first phase difference element 42, the diffusion transmission element 43, the light separation combination element 44, the second phase difference element 45, the first condensing element 46, and the diffusion optical element 47 are disposed on the illumination optical axis Ax1.

The wavelength conversion element 49, the second condensing element 48, the light separation combination element 44, and the third phase difference element 50 are disposed on the illumination optical axis Ax2.

Configuration of the Light Source Housing

The light source housing CA is a sealed housing that houses the afocal optical element 41, the first phase difference element 42, the diffusion transmission element 43, the light separation combination element 44, the second phase difference element 45, the first condensing element 46, the diffusion optical element 47, the second condensing element 48, the wavelength conversion element 49, the third phase difference element 50, and the light source section 6 and into which dust and the like less easily intrude.

Configuration of the Light Source Section

Figure 3:
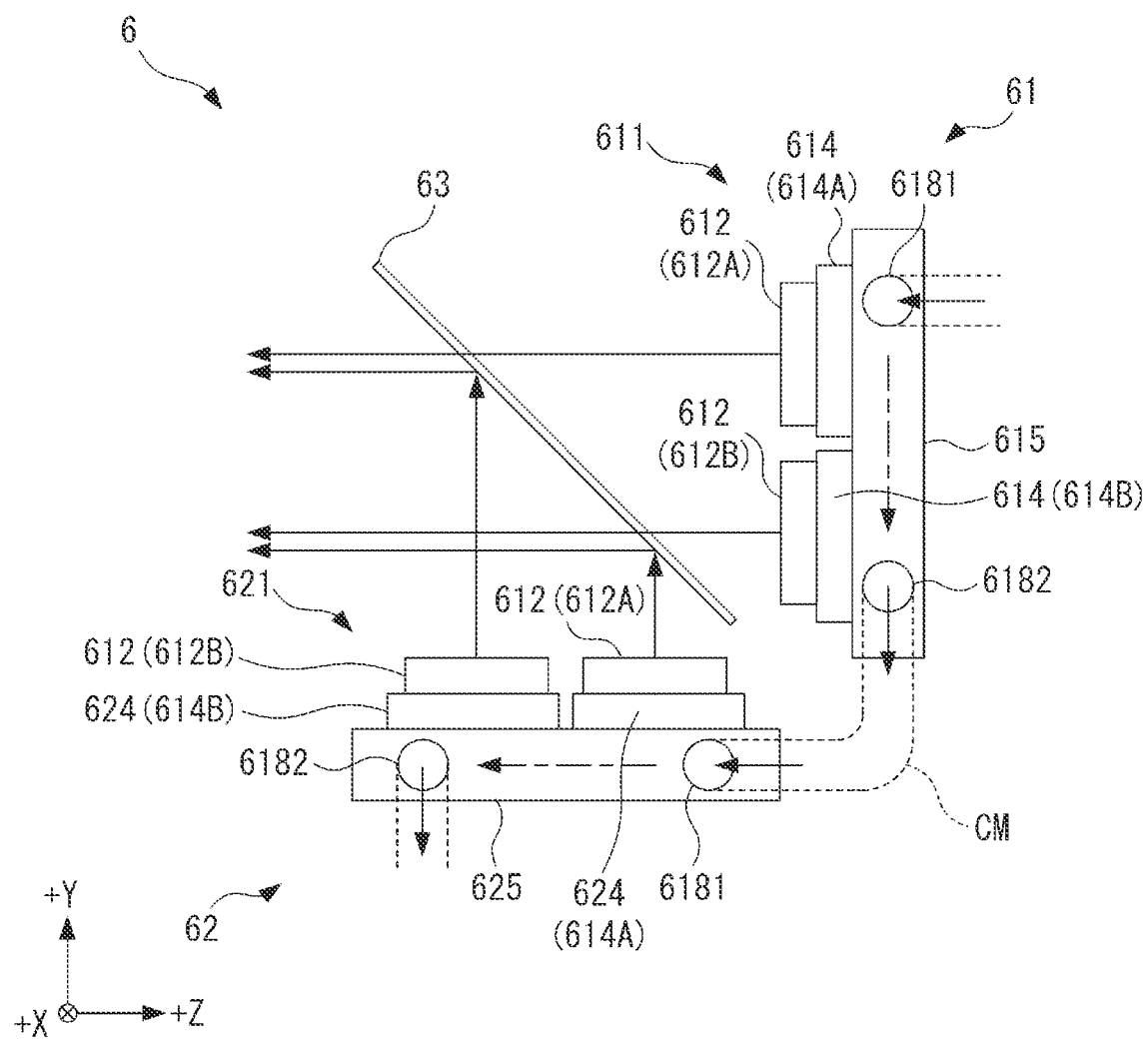
FIG. 3 is a schematic diagram showing the configuration of a light source section according to the first embodiment.

FIG. 3 is a schematic diagram showing the configuration of the light source section 6. Specifically, FIG. 3 is a diagram schematically showing a cross section of the light source section 6 viewed from the −X direction.

The light source section 6 emits, in the −Z direction, light made incident on the diffusion optical element 47 and the wavelength conversion element 49 explained below. The light source section 6 includes, as shown in FIG. 3, a first light source section 61, a second light source section 62, and a light combining member 63.

The first light source section 61 is disposed in the +Z direction in the light source section 6. The first light source section 61 includes a first light source module 611, a first heat receiving plate 614, and a first cooling plate 615 and emits light source light, which is the blue light, in the −Z direction. The first cooling plate 615 cools the first light source module 611 by transferring, to the cooling liquid flowing on the inside, heat transferred from the first light source module 611 via the first heat receiving plate 614.

The second light source section 62 is disposed in the −Y direction in the light source section 6. The second light source section 62 includes a second light source module 621, a plurality of second heat receiving plates 624, and a second cooling plate 625 and emits the light source light, which is the blue light, in the +Y direction. The second cooling plate 625 cools the second light source module 621 by transferring, to the cooling liquid flowing on the inside, heat transferred from the second light source module 621 via the second heat receiving plates 624.

Detailed configurations of the first light source section 61 and the second light source section 62 are explained in detail below.

The light combining member 63 is provided in a position where an optical path of the light source light emitted from the first light source section 61 and an optical path of the light source light emitted from the second light source section 62 cross. The light combining member 63 combines the light source light emitted from the first light source section 61 in the −Z direction and the light source light emitted from the second light source section 62 in the +Y direction and emits combined light in the −Z direction. A stripe mirror can be illustrated as the light combining member 63.

The light source light emitted by such a light source section 6 is, for example, laser light having a peak wavelength of 440 nm. Specifically, as the light source light, the light source section 6 emits s-polarized blue light BLs to the light separation combination element 44 shown in FIG. 2. The light source section 6 may emit p-polarized blue light BLp to the light separation combination element 44 or may emit blue light in which s-polarized light and p-polarized light are mixed. In the latter case, the first phase difference element 42 can be omitted.

Configuration of the Afocal Optical Element

The afocal optical element 41 adjusts a light beam diameter of the blue light BLs made incident from the light source section 6 in the −Z direction. The afocal optical element 41 is configured by a lens 411 that condenses light made incident thereon and a lens 412 that collimates a light beam condensed by the lens 411. The afocal optical element 41 may be absent.

Configuration of the First Phase Difference Element

The first phase difference element 42 is provided between the lens 411 and the lens 412. The first phase difference element 42 converts a part of the blue light BLs made incident thereon and emits light including the s-polarized blue light BLs and the p-polarized blue light BLp. The first phase difference element 42 may be turned by a turning device centering on a turning axis extending along the illumination optical axis Ax1. In this case, ratios of an s-polarized light component and a p-polarized light component in the blue light emitted from the first phase difference element 42 can be adjusted according to a turning angle of the first phase difference element 42.

Configuration of the Diffusion Transmission Element

The diffusion transmission element 43 uniformizes an illuminance distribution of the blue lights BLp and BLs made incident from the lens 412 in the −Z direction. As the diffusion transmission element 43, a configuration including a hologram, a configuration in which a plurality of small lenses are arrayed in an optical axis orthogonal surface, and a configuration in which a surface through which light passes is a rough surface can be illustrated.

A homogenizer optical element including a pair of multi-lenses may be adopted instead of the diffusion transmission element 43.

Configuration of the Light Separation Combination Element

The blue lights Bls and BLp having passed through the diffusion transmission element 43 are made incident on the light separation combination element 44.

The light separation combination element 44 has a function of a light separation element that separates light made incident thereon and a function of a light combination element that combines lights made incident thereon from two directions. In other words, the light separation combination element 44 functions as the light separation element and functions as the light combination element.

The light separation combination element 44 is a polarizing beam splitter and separates an s-polarized light component and a p-polarized light component included in light made incident thereon. Specifically, the light separation combination element 44 reflects the s-polarized light component and transmits the p-polarized light component. The light separation combination element 44 has a color separation characteristic for transmitting light having a predetermined or larger wavelength irrespective whether a polarized light component is the s-polarized light component or the p-polarized light component. Therefore, of the blue lights BLp and BLs made incident on the light separation combination element 44 from the diffusion transmission element 43, the p-polarized blue light BLp is transmitted through the light separation combination element 44 in the −Z direction and made incident on the second phase difference element 45. On the other hand, the s-polarized blue light BLs is reflected in the −X direction by the light separation combination element 44 and made incident on the second condensing element 48.

The light separation combination element 44 may include a function of a half mirror that transmits a part of light made incident from the light source section 6 via the diffusion transmission element 43 and reflects the remaining light and a function of a dichroic mirror that reflects the blue light made incident from the diffusion optical element 47 and transmits fluorescent light made incident from the wavelength conversion element 49 and having a wavelength larger than the wavelength of the blue light. In this case, the first phase difference element 42 can be omitted.

Configuration of the Second Phase Difference Element

The second phase difference element 45 is disposed in the −Z direction with respect to the light separation combination element 44. That is, the second phase difference element 45 is disposed between the light separation combination element 44 and the first condensing element 46. The second phase difference element 45 converts the blue light BLp having passed through the light separation combination element 44 into circularly polarized blue light BLc. The blue light BLc having passed through the second phase difference element 45 in the −Z direction is made incident on the first condensing element 46.

Configuration of the First Condensing Element

The first condensing element 46 condenses, on the diffusion optical element 47, the blue light BLc transmitted through the light separation combination element 44 in the −Z direction and made incident from the second phase difference element 45. The first condensing element 46 collimates light made incident from the diffusion optical element 47 in the +Z direction and emits the light to the second phase difference element 45.

In this embodiment, the first condensing element 46 is configured by three lenses 461, 462, and 463. However, the number of lenses configuring the first condensing element 46 does not matter.

Configuration of the Diffusion Optical Element

The diffusion optical element 47 diffuses, at the same diffusion angle as a diffusion angle of fluorescent light YL emitted from the wavelength conversion element 49, the blue light BLc made incident thereon. Specifically, the diffusion optical element 47 reflects and diffuses, in the +Z direction, the blue light BLc made incident from the first condensing element 46 in the −Z direction. The diffusion optical element 47 is a reflection element that causes Lambertian reflection of the blue light BLc made incident thereon. The diffusion optical element 47 may be rotated by a rotation device centering on a rotation axis parallel to the illumination optical axis Ax1.

The blue light BLc diffused by the diffusion optical element 47 is made incident on the second phase difference element 45 after being transmitted through the first condensing element 46. When the blue light BLc made incident on the diffusion optical element 47 is reflected by the diffusion optical element 47, the blue light BLc is converted into circularly polarized light, a rotating direction of which is the opposite direction of a rotating direction of the blue light BLc. Accordingly, the blue light BLc made incident on the second phase difference element 45 via the first condensing element 46 is converted into the s-polarized blue light BLs by the second phase difference element 45. The blue light BLs is reflected in the +X direction by the light separation combination element 44 and made incident on the third phase difference element 50.

Configuration of the Second Condensing Element

The second condensing element 48 condenses, on the wavelength conversion element 49, the blue light BLs reflected in the −X direction by the light separation combination element 44. The second condensing element 48 collimates the fluorescent light YL made incident from the wavelength conversion element 49 in the +X direction and emits the collimated fluorescent light YL to the light separation combination element 44.

In this embodiment, the second condensing element 48 is configured by three lenses 481, 482, and 483. However, the number of lenses configuring the second condensing element 48 does not matter.

Schematic Configuration of the Wavelength Conversion Element

The wavelength conversion element 49 converts the wavelength of the blue light BLs made incident from the second condensing element 48.

That is, the wavelength conversion element 49 converts the blue light BLs made incident from the second condensing element 48 into the fluorescent light YL having a wavelength larger than the wavelength of the blue light BLs and emits the fluorescent light YL. The wavelength conversion element 49 is a reflection-type wavelength conversion element that emits the fluorescent light YL to an incidence side of the blue light BLs. The blue light BLs made incident on the wavelength conversion element 49 is equivalent to excitation light or light in a first wavelength band. The fluorescent light YL is equivalent to converted light or light in a second wavelength band.

The wavelength conversion element 49 includes a phosphor wheel 491 and a rotation device 495 that rotates the phosphor wheel 491. The phosphor wheel 491 includes a wavelength conversion layer 492, a reflection layer 493, and a supporting substrate 494.

The wavelength conversion layer 492 contains a phosphor and is provided in a ring shape centering on a rotation axis of the phosphor wheel 491. The reflection layer 493 is provided on the opposite side of an incidence side of the excitation light with respect to the wavelength conversion layer 492 and reflects light made incident from the wavelength conversion layer 492. The supporting substrate 494 supports the wavelength conversion layer 492 and the reflection layer 493.

The wavelength conversion element 49 may be configured not to be rotated by the rotation device.

The fluorescent light YL emitted from the wavelength conversion element 49 in the +X direction is made incident on the light separation combination element 44 after being collimated by the second condensing element 48. Since the light separation combination element 44 has a characteristic of transmitting the fluorescent light YL as explained above, the fluorescent light YL made incident on the light separation combination element 44 along the +X direction is transmitted through the light separation combination element 44 and made incident on the third phase difference element 50. That is, light made incident on the third phase difference element 50 from the light separation combination element 44 is white light in which the blue light BLs and the fluorescent light YL are mixed.

Configuration of the Third Phase Difference Element

The third phase difference element 50 converts the white light including the blue light BLs and the fluorescent light YL made incident from the light separation combination element 44 into white light in which s-polarized light and p-polarized light are mixed. The white light converted in this way is emitted in the +X direction as illumination light LT and is made incident on the uniformizing device 31 explained above.

Configuration of the First Light Source Section

Figure 4:
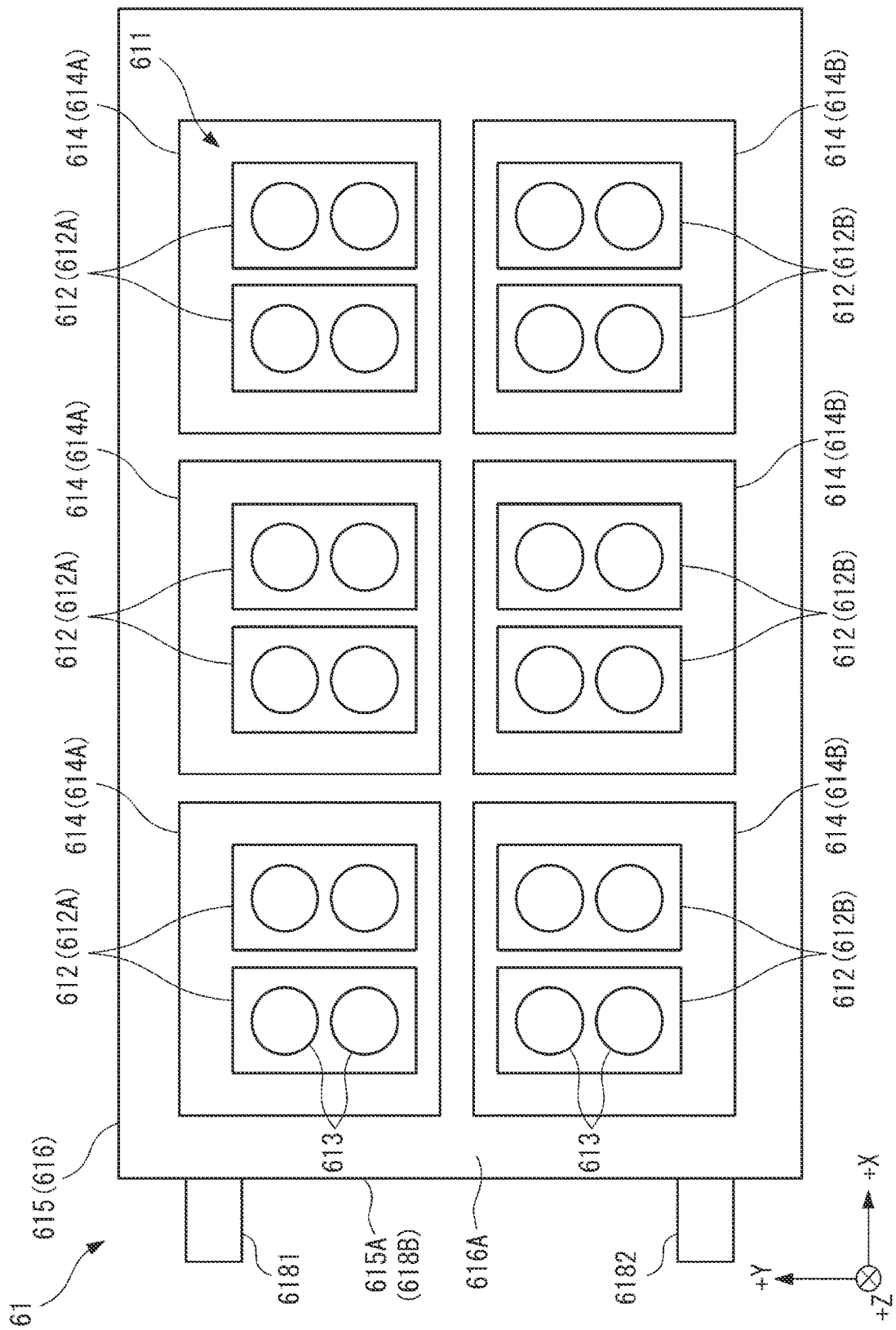
FIG. 4 is a plan view showing a first light source section according to the first embodiment.

FIG. 4 is a plan view schematically showing the first light source section 61 viewed from the −Z direction. That is, FIG. 4 is a schematic diagram showing the first light source section 61 viewed from an emission side of the light source light.

The first light source section 61 includes, as shown in FIG. 4, the first light source module 611, the first heat receiving plate 614, and the first cooling plate 615.

Configuration of the First Light Source Module

The first light source module 611 emits the blue light. The first light source module 611 includes a plurality of substrates 612 arrayed on a plane orthogonal to an optical axis of the emitted blue light. The first light source module 611 includes the plurality of substrates 612 aligned in the +X direction and the +Y direction.

Each of the plurality of substrates 612 is formed in a rectangular parallelepiped shape long in the +Y direction. Each of the plurality of substrates 612 holds at least one light emitting element 613. That is, the substrate 612 is a supporting member that supports the light emitting element 613. The substrate 612 is formed by metal having high heat transference and transfers heat generated in the light emitting element 613 to the first heat receiving plate 614.

In this embodiment, each of the plurality of substrates 612 includes two light emitting elements 613 aligned in the +Y direction. The +Y direction is equivalent to the first direction. However, the number of the light emitting elements 613 included in the substrate 612 can be changed as appropriate. Specifically, the number of the light emitting elements 613 included in the substrate 612 may be one or may be three or more.

The light emitting element 613 is a semiconductor laser that emits the blue light BLs. However, the light emitting element 613 may be configured to emit the p-polarized blue light BLp to the light separation combination element 44. As explained above, the blue light emitted by the light emitting element 613 is, for example, the laser light having the peak wavelength of 440 nm. The blue lights emitted from a plurality of light emitting elements 613 are collimated by a not-shown collimator lens and emitted.

The plurality of substrates 612 include six upstream-side substrates 612A disposed in the +Y direction and aligned in the +X direction and six downstream-side substrates 612B disposed in the −Y direction and aligned in the +X direction. That is, the first light source module 611 includes twelve substrates 612.

The six upstream-side substrates 612A are the substrates 612 disposed to correspond to an upstream-side flowing section 6185 provided in the first cooling plate 615 explained below. The upstream-side substrate 612A is attached to an upstream-side heat receiving plate 614A explained below among a plurality of first heat receiving plates 614.

The six downstream-side substrates 612B are the substrates 612 disposed to correspond to a downstream-side flowing section 6186 provided in the first cooling plate 615. The downstream-side substrate 612B is attached to a downstream-side heat receiving plate 614B explained below among the plurality of first heat receiving plates 614.

Configuration of the First Heat Receiving Plate

The plurality of first heat receiving plates 614 are provided between the first light source module 611 and the first cooling plate 615. The plurality of first heat receiving plates 614 support the plurality of substrates 612, receive the heat of the light emitting elements 613 transferred from the substrates 612, and transfer the heat to the first cooling plate 615. Each of the first heat receiving plates 614 is formed in a substantially rectangular shape larger than the substrate 612 when viewed from the −Z direction, which is the emission side of the light source light by the first light source module 611.

In this embodiment, the plurality of first heat receiving plates 614 include three upstream-side heat receiving plates 614A disposed in the +Y direction and aligned in the +X direction and three downstream-side heat receiving plates 614B disposed in the −Y direction and aligned in the +X direction.

The three upstream-side heat receiving plates 614A are the first heat receiving plates 614 disposed to correspond to the upstream-side flowing section 6185 in the first cooling plate 615. Each of the three upstream-side heat receiving plates 614A supports two upstream-side substrates 612A among the six upstream-side substrates 612A. That is, each of the three upstream-side heat receiving plates 614A is disposed in the +X direction in a state in which the upstream-side heat receiving plate 614A supports the two upstream-side substrates 612A.

The three downstream-side heat receiving plates 614B are the first heat receiving plates 614 disposed to correspond to the downstream-side flowing section 6186 in the first cooling plate 615. Each of the three downstream-side heat receiving plates 614B supports two downstream-side substrates 612B among the six downstream-side substrates 612B. That is, each of the three downstream-side heat receiving plates 614B is disposed in the +X direction in a state in which the downstream-side heat receiving plate 614B supports the two downstream-side substrates 612B.

Configuration of the First Cooling Plate

Figure 5:
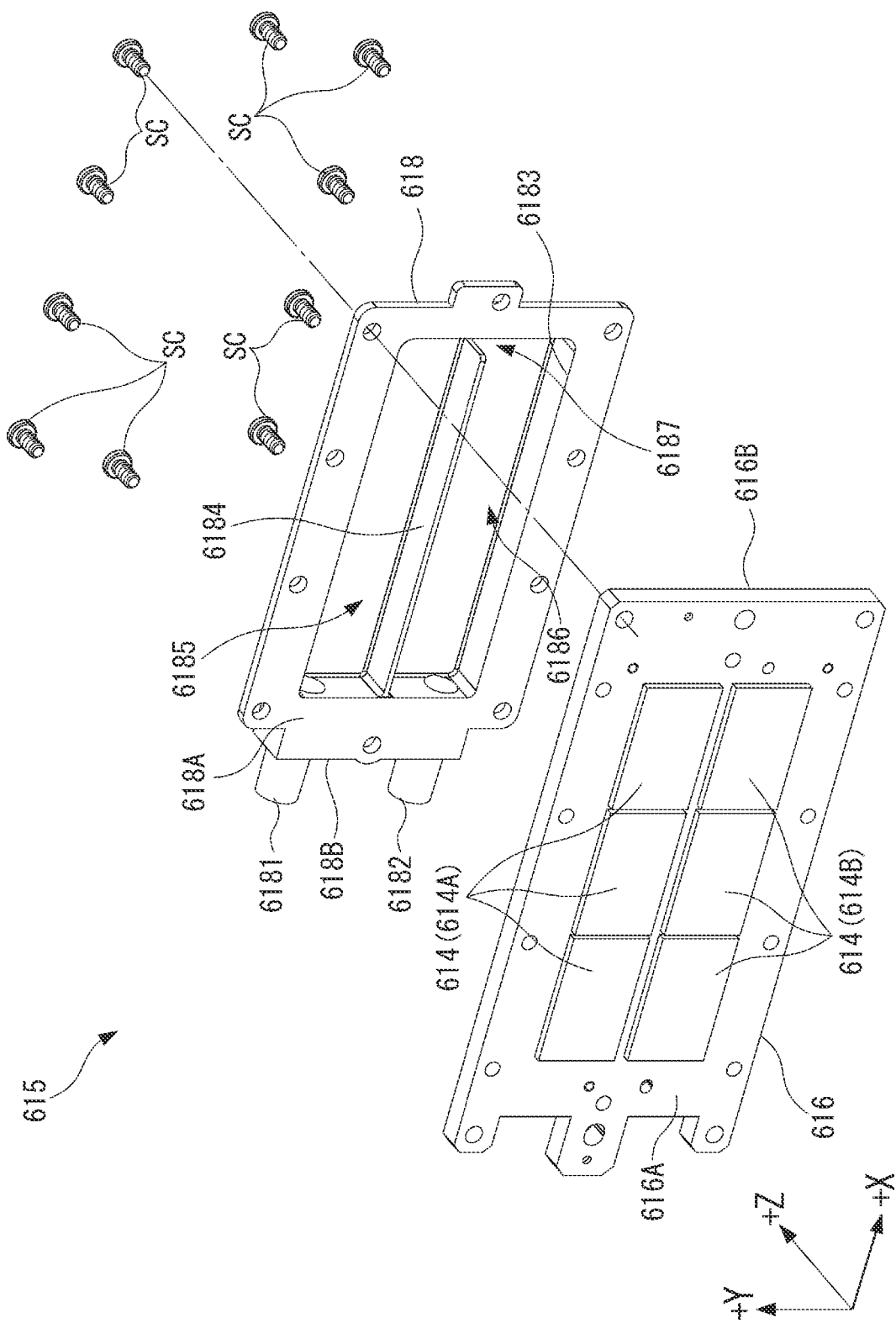
FIG. 5 is an exploded perspective view showing a first cooling plate according to the first embodiment.
Figure 6:
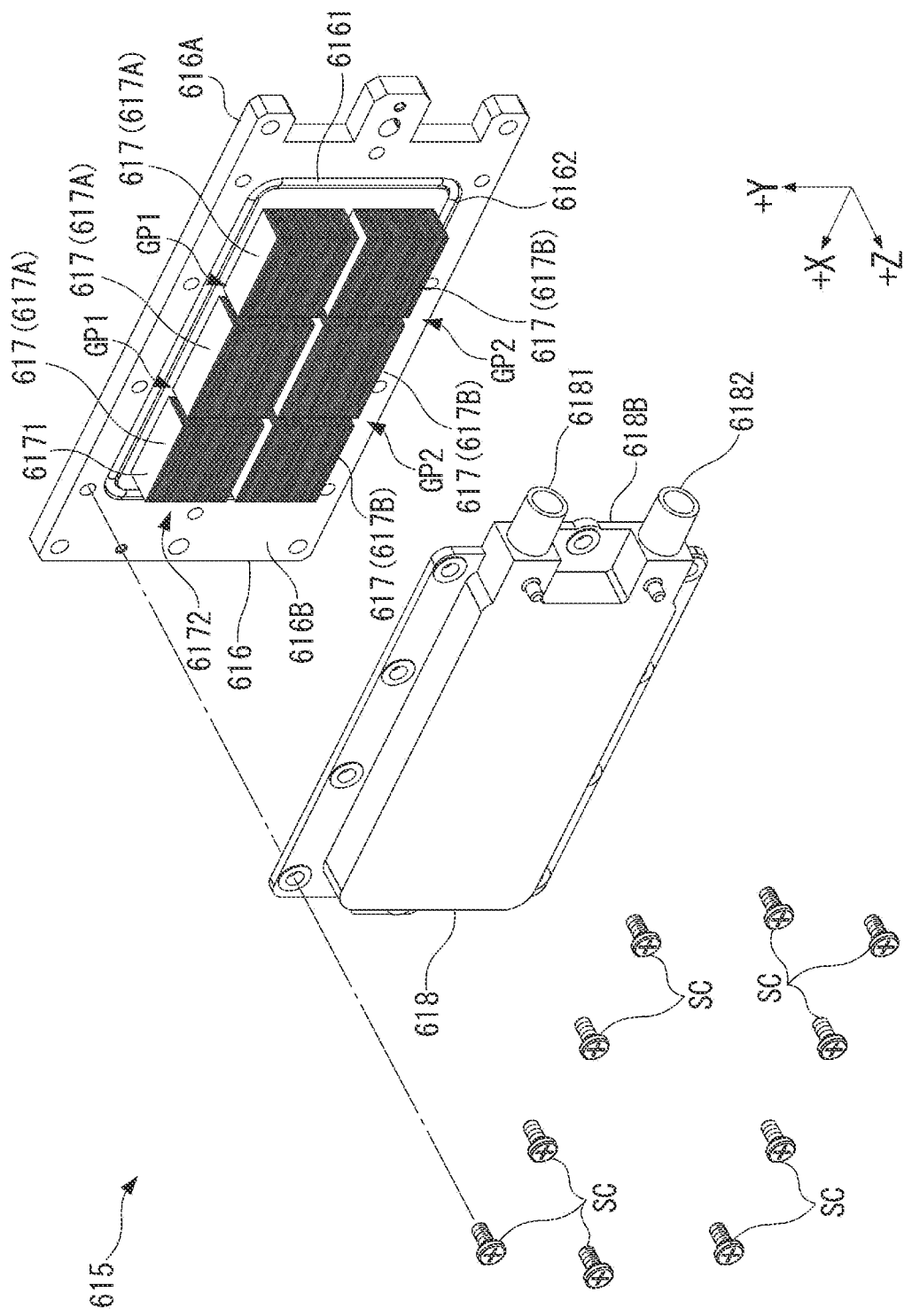
FIG. 6 is an exploded perspective view showing the first cooling plate according to the first embodiment.

FIG. 5 is an exploded perspective view of the first cooling plate 615 viewed from the emission side of the light source light. FIG. 6 is an exploded perspective view of the first cooling plate 615 viewed from the opposite side of the emission side of the light source light.

The first cooling plate 615 is a heat exchanger, on the inside of which a cooling channel in which the cooling liquid is capable of flowing is provided, the heat exchanger transferring transferred heat to the cooling liquid. The first cooling plate 615 includes, as shown in FIGS. 5 and 6, a first plate element 616 and a second plate element 618. The first cooling plate 615 is configured by fixing the second plate element 618 to the first plate element 616 with a plurality of screws SC.

Configuration of the First Plate Element

The first plate element 616 includes, as shown in FIG. 5, a first surface 616A on which the plurality of first heat receiving plates 614 are disposed. The three upstream-side heat receiving plates 614A are disposed to be capable of transferring heat in portions in the +Y direction on the first surface 616A. The three downstream-side heat receiving plates 614B are disposed to be capable of transferring heat in portions in the −Y direction on the first surface 616A. That is, the first surface 616A is a heat receiving surface that receives heat from the plurality of first heat receiving plates 614.

The first plate element 616 includes, as shown in FIG. 6, a plurality of heat transfer sections 617, a groove section 6161, and a sealing member 6162 on a second surface 616B on the opposite side of the first surface 616A.

The plurality of heat transfer sections 617 are disposed in a recess 6183 of the second plate element 618 explained below. The plurality of heat transfer sections 617 include three upstream-side heat transfer sections 617A disposed in the +Y direction and aligned in the +X direction on the second surface 616B and three downstream-side heat transfer sections 617B disposed in the −Y direction and aligned in the +X direction on the second surface 616B.

When the first plate element 616 and the second plate element 618 are combined, the three upstream-side heat transfer sections 617A are disposed in the upstream-side flowing section 6185 (see FIGS. 6 and 7) in the recess 6183. The three upstream-side heat transfer sections 617A are separated from one another in the +X direction. In other words, the first cooling plate 615 includes gaps GP1 among the three upstream-side heat transfer sections 617A in the +X direction.

When the first plate element 616 and the second plate element 618 are combined, the three downstream-side heat transfer sections 617B are disposed in the downstream-side flowing section 6186 (see FIGS. 6 and 7) in the recess 6183. The three downstream-side heat transfer sections 617B are separated from one another in the +X direction. In other words, the first cooling plate 615 includes gaps GP2 among the three downstream-side heat transfer sections 617B in the +X direction.

Each of the plurality of heat transfer sections 617 includes a plurality of fins 6171 and a plurality of channels 6172.

The plurality of fins 6171 extend along the +X direction (the second direction) and are arrayed along the +Y direction (the first direction). The plurality of fins 6171 are formed by metal having high heat transference.

The plurality of channels 6172 are channels provided among the plurality of fins 6171, the cooling liquid being capable of flowing in the channels. When the plurality of heat transfer sections 617 are disposed in the recess 6183, the cooling liquid in the recess 6183 flows along the plurality of channels 6172. At this time, heat is transferred to the cooling liquid from the plurality of fins 6171.

The groove section 6161 is provided on the second surface 616B and surrounds the plurality of heat transfer sections 617 when viewed from the +Z direction, which is the second plate element 618 side. The groove section 6161 is recessed in the −Z direction from the second surface 616B.

The sealing member 6162 is disposed in the groove section 6161. Specifically, the sealing member 6162 is a washer fit in the groove section 6161. The sealing member 6162 seals the space between the first plate element 616 and the second plate element 618 to thereby prevent the cooling liquid from leaking to the outside of the first cooling plate 615.

Configuration of the Second Plate Element

As shown in FIGS. 5 and 6, the second plate element 618 is disposed on the opposite side of the first light source module 611 and the plurality of first heat receiving plates 614 with respect to the first plate element 616 and attached to the second surface 616B by a plurality of screws SC.

The second plate element 618 includes an opposed surface 618A opposed to the first plate element 616, an inflow section 6181, an outflow section 6182, a recess 6183, a partition wall 6184, an upstream-side flowing section 6185, a downstream-side flowing section 6186, and a coupling section 6187.

The inflow section 6181 is provided, at an end portion 618B of the second plate element 618 in the −X direction, in a part in the +Y direction (the first direction) extending along the end portion 618B. The cooling liquid flows into the inflow section 6181 from the outside. The inflow section 6181 communicates with a space in the recess 6183. The cooling liquid having flowed into the inflow section 6181 flows into the space in the recess 6183. The end portion 618B configures an end portion 615A of the first cooling plate 615 in the −X direction.

The outflow section 6182 is provided, at the end portion 618B of the second plate element 618 in the −X direction, in a part in the −Y direction (the opposite direction of the first direction) with respect to the part in the +Y direction where the inflow section 6181 is provided. The outflow section 6182 communicates with the space in the recess 6183 and causes the cooling liquid having flowed in the recess 6183 to flow out to the outside.

The recess 6183 is a recess provided substantially in the center of the opposed surface 618A and recessed to the opposite side of the first plate element 616 and is formed in a substantially rectangular shape when viewed from the first plate element 616 side.

Two sides of the outer edge of the recess 6183 extend along the +X direction. The other two sides extend along the +Y direction.

The partition wall 6184 partitions the space in the recess 6183. Specifically, on the inner wall of the recess 6183 in the −X direction, the partition wall 6184 extends in the +X direction from the center in the +Y direction to a position not reaching the inner edge of the recess 6183 in the +X direction.

The upstream-side flowing section 6185 and the downstream-side flowing section 6186 are spaces in the recess 6183 partitioned by the partitioning wall 6184. The upstream-side flowing section 6185 is a space in the +Y direction with respect to the partition wall 6184 of the spaces in the recess 6183 partitioned by the partition wall 6184. The downstream-side flowing section 6186 is a space in the −Y direction with respect to the partition wall 6184 of the spaces in the recess 6183 partitioned by the partition wall 6184.

When the first plate element 616 and the second plate element 618 are combined, the three upstream-side heat transfer sections 617A are disposed in the upstream-side flowing section 6185. Similarly, the three downstream-side heat transfer sections 617B are disposed in the downstream-side flowing section 6186.

The coupling section 6187 is provided in a portion on the opposite side of the inflow section 6181 and the outflow section 6182 in the recess 6183 and couples the upstream-side flowing section 6185 and the downstream-side flowing section 6186. The coupling section 6187 is formed because the partition wall 6184 does not reach the inner wall of the recess 6183 in the +X direction.

Cooling Channel in the First Cooling Plate

Figure 7:
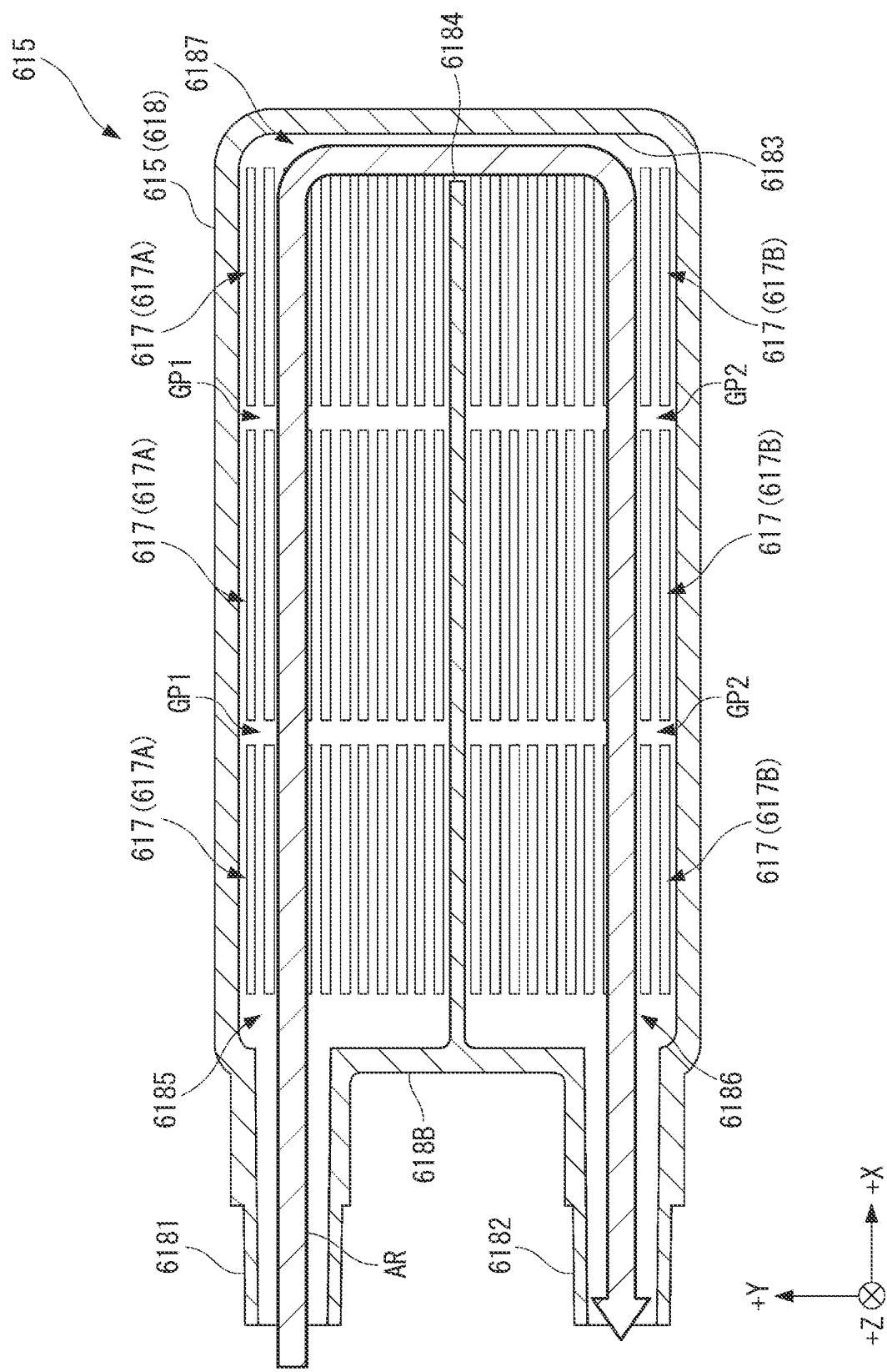
FIG. 7 is a sectional view showing the first cooling plate according to the first embodiment.

FIG. 7 is a diagram showing a cross section along an XY plane of the first cooling plate 615. In other words, FIG. 7 is a diagram showing a channel of the cooling liquid in the first cooling plate 615. In FIG. 7, a thick line arrow AR indicates a flowing direction of the cooling liquid.

As shown in FIG. 7, the cooling liquid having flowed into the first cooling plate 615 from the inflow section 6181 flows in the +X direction in the upstream-side flowing section 6185 partitioned by the partitioning wall 6184. At this time, the cooling liquid flows in the plurality of channels 6172 (see FIG. 6) included in the upstream-side heat transfer section 617A provided on the most upstream among the three upstream-side heat transfer sections 617A and, thereafter, reaches the gap GP1 in the −X direction. Thereafter, the cooling liquid flows in the plurality of channels 6172 included in the upstream-side heat transfer section 617A in the center in the +X direction and, thereafter, reaches the gap GP1 in the +X direction. The cooling liquid flows in the plurality of channels 6172 included in the upstream-side heat transfer section 617A provided on the most downstream and, thereafter, reaches the coupling section 6187. In a process in which the cooling liquid flows in the upstream-side flowing section 6185 in this way, heat is transferred to the cooling liquid from the plurality of fins 6171 included in each of the three upstream-side heat transfer sections 617A.

The cooling liquid reaching the coupling section 6187 flows in the coupling section 6187 in the −Y direction and flows, in the −X direction, in the downstream-side flowing section 6186 partitioned by the partitioning wall 6184. At this time, the cooling liquid flows, in order, the plurality of channels 6172 included in the downstream-side heat transfer section 617B in the +X direction, the gap GP2 in the +X direction, the plurality of channels 6172 included in the downstream-side heat transfer section 617B in the center, the gap GP2 in the −X direction, and the plurality of channels 6172 included in the downstream-side heat transfer section 617B in the −X direction. In a process in which the cooling liquid flows in the downstream-side flowing section 6186 in this way, heat is transferred to the cooling liquid from the plurality of fins 6171 included in each of the three downstream-side heat transfer sections 617B.

The cooling liquid having flowed in the downstream-side flowing section 6186 is discharged to the outside of the first cooling plate 615 via the outflow section 6182.

Separated Displacement of the Heat Transfer Sections

As explained above, the three upstream-side heat transfer sections 617A are separated from one another in the +X direction in which the cooling liquid flows. In other words, the gaps GP1 dividing the upstream-side heat transfer sections 617A adjacent to one another are provided among the three upstream-side heat transfer sections 617A. Accordingly, compared with when one heat transfer section having a total dimension of the three upstream-side heat transfer sections 617A and the two gaps GP1 in the +X direction is provided instead of the three upstream-side heat transfer sections 617A, a pressure loss of the cooling liquid flowing in the upstream-side flowing section 6185 can be reduced. Consequently, even if a large pump is not adopted in the cooling device, it is possible to allow the cooling liquid to easily flow to the three upstream-side heat transfer sections 617A. Therefore, it is possible to improve cooling efficiency of the plurality of upstream-side substrates 612A by the first cooling plate 615, that is, cooling efficiency of the light emitting elements 613 disposed on the plurality of upstream-side substrates 612A. Besides, it is possible to prevent an increase in the size of the projector 1.

Since the gaps GP2 are provided, the three downstream-side heat transfer sections 617B are also separated from one another in the +X direction in which the cooling liquid flows. Accordingly, compared with when one heat transfer section having a total dimension of the three downstream-side heat transfer sections 617B and the two gaps GP2 in the +X direction is provided instead of the three downstream-side heat transfer sections 617B, a pressure loss of the cooling liquid flowing in the downstream-side heat transfer section 617B can be reduced. Consequently, even if a large pump is not adopted in the cooling device, it is possible to allow the cooling liquid to easily flow to the downstream-side flowing section 6186. Therefore, it is possible to improve cooling efficiency of the plurality of downstream-side substrates 612B by the first cooling plate 615, that is, cooling efficiency of the light emitting elements 613 disposed on the plurality of downstream-side substrates 612B. Besides, it is possible to prevent an increase in the size of the projector 1.

Positions of the Gaps that Separate the Heat Transfer Sections

Figure 8:
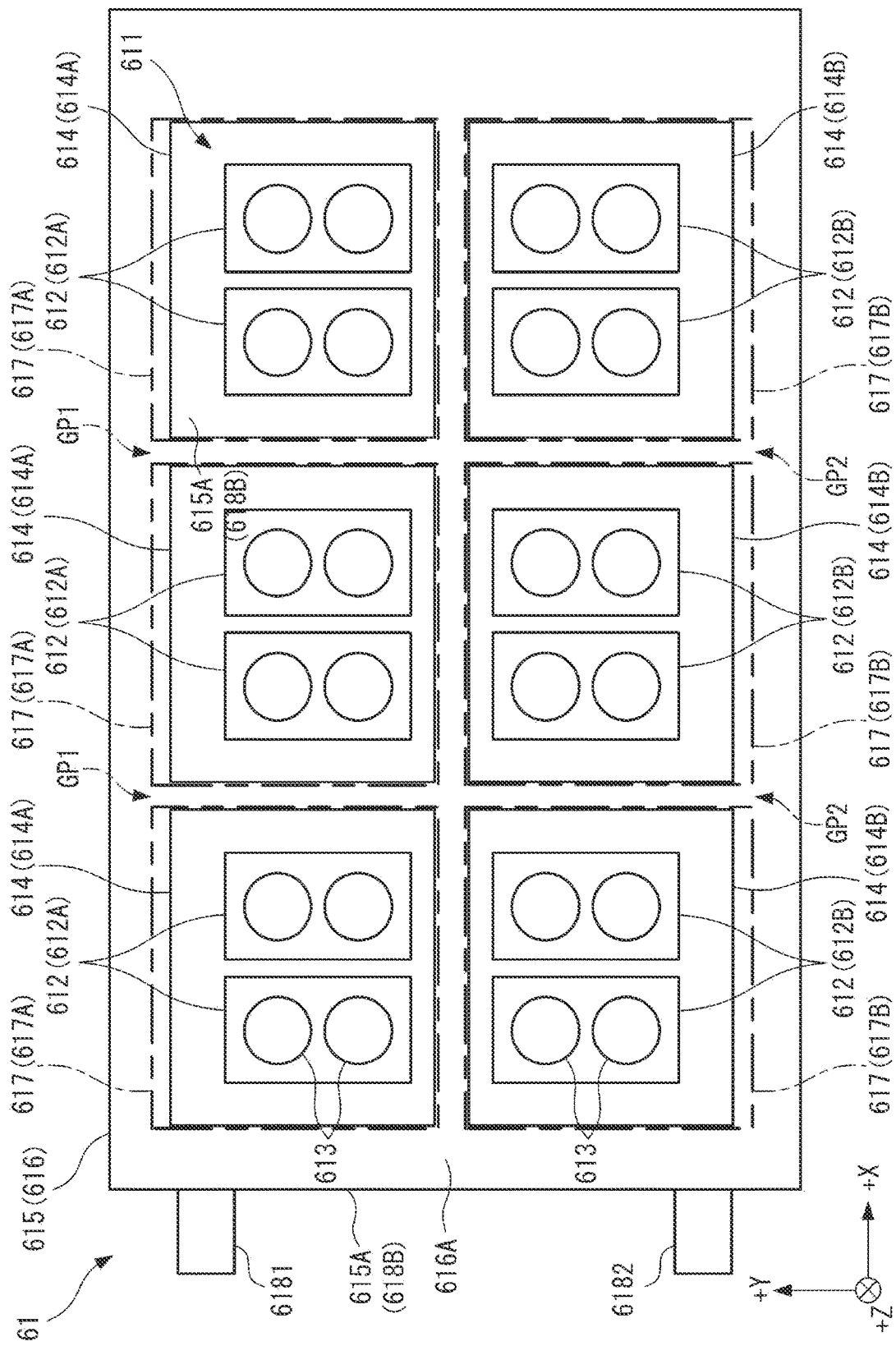
FIG. 8 is a schematic diagram showing a positional relation between a first heat receiving plate and a heat transfer section according to the first embodiment.

FIG. 8 is a schematic diagram showing a positional relation between the first heat receiving plate 614 and the heat transfer section 617. In other words, FIG. 8 is a schematic diagram showing positions where the plurality of heat transfer sections 617 are separated, that is, the positions of the gaps GP1 and GP2.

The positions where the plurality of heat transfer sections 617 are separated from one another, that is, the positions of the gaps GP1 and GP2 provided among the plurality of heat transfer sections 617 are explained below.

As shown in FIG. 8, the heat transfer section 617 is provided to correspond to the first heat receiving plate 614. Specifically, each of the three upstream-side heat transfer sections 617A is provided to correspond to each of the three upstream-side heat receiving plates 614A.

Since the gap GP1 is provided between the two upstream-side heat transfer sections 617A adjacent to each other as explained above, a pressure loss of the cooling liquid can be reduced. The gaps GP1 provided among the three upstream-side heat transfer sections 617A correspond to the portions among the three upstream-side heat receiving plates 614A.

Since the upstream-side heat transfer section 617A is absent in the gap GP1, heat is less easily transferred to the cooling liquid in the gap GP1. However, since the upstream-side heat transfer section 617A is provided to correspond to the upstream-side heat receiving plate 614A, the heat of the upstream-side substrate 612A can be efficiently transferred to the upstream-side heat transfer section 617A via the upstream-side heat receiving plate 614A. Consequently, the heat of the light emitting elements 613 can be efficiently transferred from the upstream-side heat transfer section 617A to the cooling liquid.

Similarly, each of the three downstream-side heat transfer sections 617B is provided to correspond to each of the three downstream-side heat receiving plates 614B. Accordingly, the gaps GP2 provided among the three downstream-side heat transfer sections 617B are provided to correspond to the position among the three downstream-side heat receiving plates 614B. Since the gap GP2 is provided between the two downstream-side heat transfer sections 617B adjacent to each other as explained above, a pressure loss of the cooling liquid can be reduced.

Since the downstream-side heat transfer section 617B is absent in the gap GP2, heat is not transferred to the cooling liquid in the gap GP2. However, since the downstream-side heat transfer section 617B is provided to correspond to the downstream-side heat receiving plate 614B, the heat of the downstream-side substrate 612B can be efficiently transferred to the downstream-side heat transfer section 617B via the downstream-side heat receiving plate 614B. Consequently, the heat of the light emitting elements 613 can be efficiently transferred from the downstream-side heat transfer section 617B to the cooling liquid.

Configuration of the Second Light Source Section

The second light source section 62 has the same configuration as the configuration of the first light source 61. That is, the second light source section 62 includes, as shown in FIG. 3, the second light source module 621, the plurality of second heat receiving plates 624, and the second cooling plate 625.

The second light source module 621 has the same configuration as the configuration of the first light source module 611. Specifically, the second light source module 621 is explained in FIG. 4 in which the first light source section 61 is explained. The second light source module 621 includes the plurality of substrates 612 each including at least one light emitting element 613. The plurality of substrates 612 include the three upstream-side substrates 612A aligned in the +X direction and the three downstream-side substrates 612B aligned in the +X direction.

The plurality of second heat receiving plates 624 have the same configuration as the configuration of the plurality of first heat receiving plates 614. Specifically, the plurality of second heat receiving plates 624 include the three upstream-side heat receiving plates 614A aligned in the +X direction and the three downstream-side heat receiving plates 614B aligned in the +X direction.

The second cooling plate 625 has the same configuration as the configuration of the first cooling plate 615. For example, the second cooling plate 625 includes the inflow section 6181 and the outflow section 6182.

Channel Configuration of the First Cooling Plate and the Second Cooling Plate

Figure 9:
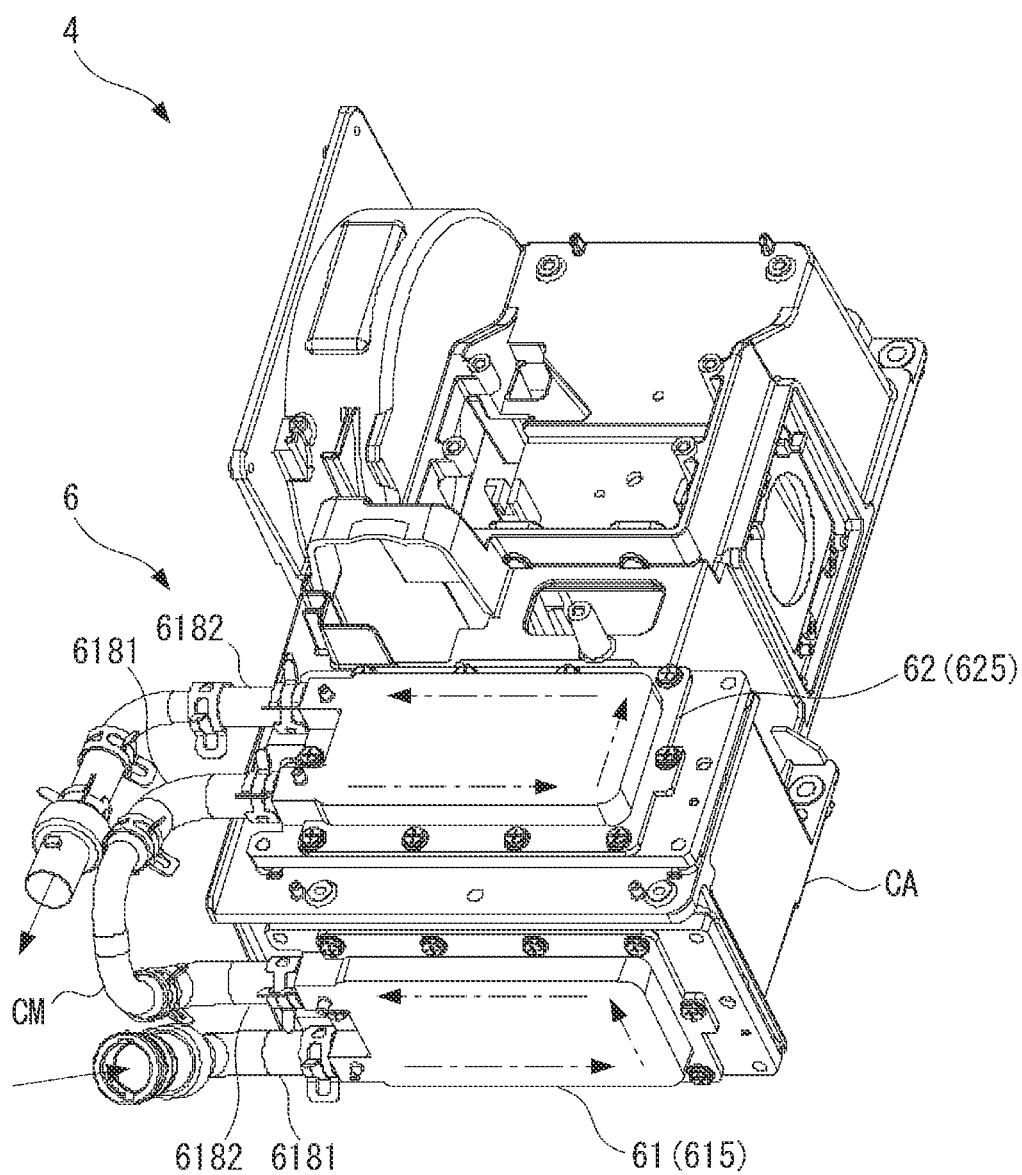
FIG. 9 is a perspective view showing a coupling state of the first cooling plate and a second cooling plate according to the first embodiment.

FIG. 9 is a perspective view showing a coupling state of the first cooling plate 615 and the second cooling plate 625. In other words, FIG. 9 is a perspective view showing the light source housing CA to which the first light source section 61 and the second light source section 62 are attached.

The outflow section 6182 of the first cooling plate 615 is coupled to the inflow section 6181 of the second cooling plate 625 via a pipe CM. Accordingly, as shown in FIGS. 3 and 9, the cooling liquid having flowed out from the outflow section 6182 of the first cooling plate 615 flows into the inflow section 6181 of the second cooling plate 625. As indicated by an alternate long and short dash line arrow in FIG. 9, the cooling liquid having flowed into the second cooling plate 625 flows in the upstream-side flowing section 6185, the coupling section 6187, and the downstream-side flowing section 6186 of the second cooling plate 625 (see FIGS. 5 and 7) in order and is discharged from the outflow section 6182 of the second cooling plate 625.

The cooling liquid having relatively low temperature flows into the inflow section 6181 of the first cooling plate 615. The cooling liquid to which heat is transferred in the first cooling plate 615 flows to the inflow section 6181 of the second cooling plate 625. Accordingly, the temperature of the cooling liquid rises in the order of the upstream-side flowing section 6185 of the first cooling plate 615, the downstream-side flowing section 6186 of the first cooling plate 615, the upstream-side flowing section 6185 of the second cooling plate 625, and the downstream-side flowing section 6186 of the second cooling plate 625.

On the other hand, in general, as the temperature of the light emitting element 613 is lower within an effective temperature range, an emitted light amount of the light emitting element 613 is larger and, as the temperature of the light emitting element 613 is higher within the effective temperature range, the emitted light amount of the light emitting element 613 is smaller.

Accordingly, the first light source section 61 and the second light source section 62 are disposed such that light emitted from a portion where an emitted light amount is large in the first light source section 61 and light emitted from a portion where an emitted light amount is small in the second light source section 62 are combined and light emitted from a portion where an emitted light amount is small in the first light source section 61 and light emitted from a portion where an emitted light amount is large in the second light source section 62 are combined.

Specifically, as shown in FIG. 3, the first light source section 61 and the second light source section 62 are disposed such that light emitted from the upstream-side substrate 612A of the first light source section 61 and light emitted from the downstream-side substrate 612B of the second light source section 62 are combined and light emitted from the downstream-side substrate 612B of the first light source section 61 and light emitted from the upstream-side substrate 612A of the second light source section 62 are combined. Consequently, the illuminance of light emitted from the light source section 6 can be substantially uniformized.

In this embodiment, the plurality of upstream-side heat transfer sections 617A are separated from one another in the +X direction and the plurality of downstream-side heat transfer sections 617B are separated from one another in the +X direction to increase a flow rate of the cooling liquid. In this regard as well, the heat transferred from the plurality of light emitting elements 613 can be easily transferred to the cooling liquid. Therefore, it is possible to prevent luminance unevenness from occurring in light emitted from the light source section 6.

Effects of the First Embodiment

The projector 1 according to this embodiment explained above achieves the following effects.

The projector 1 includes the light source device 4, the image forming device 34 that modulates light emitted from the light source device 4 and forms image light, and the projection optical device 36 that projects the image light formed by the image forming device 34.

The light source device 4 includes the light source section 6. The light source section 6 includes the first light source section 61 and the second light source section 62. The first light source section 61 includes the first light source module 611, the plurality of first heat receiving plates 614, and the first cooling plate 615. The first light source module 611 is equivalent to the light source module. The plurality of first heat receiving plates 614 are equivalent to the plurality of heat receiving plates. The first cooling plate 615 is equivalent to the cooling plate. The first light source module 611 includes the plurality of substrates 612 on which the light emitting elements 613 are disposed. The plurality of first heat receiving plates 614 are coupled to the first light source module 611.

The first cooling plate 615 is coupled to each of the plurality of first heat receiving plates 614. The cooling liquid flows on the inside of the first cooling plate 615. The first cooling plate 615 includes the inflow section 6181, the outflow section 6182, the upstream-side flowing section 6185, the downstream-side flowing section 6186, and the plurality of heat transfer sections 617.

The inflow section 6181 is provided in the part in the +Y direction (the first direction) extending along the end portion 615A in the −X direction in the first cooling plate 615. The cooling liquid flows into the inflow section 6181. The outflow section 6182 is provided in the part in the −Y direction with respect to the part in the +Y direction where the inflow section 6181 is provided at the end portion 615A. The cooling liquid flows out from the outflow section 6182. The cooling liquid having flowed in from the inflow section 6181 flows to the upstream-side flowing section 6185 in the +X direction (the second direction). The cooling liquid having flowed in the upstream-side flowing section 6185 flows to the downstream-side flowing section 6186 in the −X direction. The plurality of heat transfer sections 617 are provided in each of the upstream-side flowing section 6185 and the downstream-side flowing section 6186 and are disposed side by side in the +X direction.

The plurality of heat transfer sections 617 include the plurality of fins 6171 and the plurality of channels 6172. The plurality of fins 6171 extend along the +X direction and arrayed along the +Y direction. The plurality of channels 6172 are channels in which the cooling liquid is capable of flowing and are provided among the plurality of fins 6171. The plurality of first heat receiving plates 614 are disposed along the +X direction to correspond to the upstream-side flowing section 6185 and the downstream-side flowing section 6186. The plurality of heat transfer sections 617 are separated from one another among the plurality of first heat receiving plates 614 in the +X direction.

The second light source section 62 includes the second light source module 621 having the same configuration as the configuration of the first light source module 611, the plurality of second heat receiving plates 624 having the same configuration as the configuration of the plurality of first heat receiving plates 614, and the second cooling plate 625 having the same configuration as the configuration of the first cooling plate 615. That is, the second light source module 621 is equivalent to the light source module, the plurality of second heat receiving plates 624 are equivalent to the plurality of heat receiving plates, and the second cooling plate 625 is equivalent to the cooling plate.

With such a configuration, compared with when one heat transfer section corresponding to the length of the plurality of heat transfer sections 617 and the gaps in the +X direction is provided, since the channel 6172 extending along the +X direction can be reduced in the heat transfer sections 617, a pressure loss of the cooling liquid can be reduced. Consequently, since it is possible to allow the cooling liquid to easily flow in the plurality of heat transfer sections 617, it is possible to increase a flow rate of the cooling liquid in the first cooling plate 615 without using a large pump. Therefore, it is possible to improve cooling efficiency by the first cooling plate 615 to which the heat of the first light source module 611 is transferred via the first heat receiving plate 614. The same applies to the second light source section 62 including the second light source module 621, the plurality of second heat receiving plates 624, and the second cooling plate 625.

The positions where the plurality of heat transfer sections 617 are separated from one another are the positions corresponding to the positions among the plurality of first heat receiving plates 614 aligned in the +X direction. Accordingly, the positions where the plurality of heat transfer sections 617 are separated from one another can be located in positions where heat is less easily transferred from the plurality of first heat receiving plates 614 to the first cooling plate 615. In other words, it is possible to make it easy to transfer heat from the plurality of first heat receiving plates 614 to the plurality of heat transfer sections 617. Therefore, it is possible to make it easy to transfer heat generated in the first light source module 611 to the plurality of heat transfer sections 617. The plurality of heat transfer sections 617 transfer heat to the cooling liquid, whereby it is possible to improve cooling efficiency of the first light source module 611. The same applies to the second light source section 62.

As explained above, it is possible to allow the cooling liquid to easily flow to the first cooling plate 615 and the second cooling plate 625. Therefore, it is possible to achieve a reduction in the size of the projector 1. Since the cooling efficiency of the first light source module 611 and the cooling efficiency of the second light source module 621 are improved, it is possible to make it easy to increase a light amount of lights emitted from the light source modules 611 and 621. Therefore, it is possible to increase illuminance of a projected image.

In the light source device 4, the first cooling plate 615 includes the partition wall 6184 that extends in the +X direction and partitions the space on the inside of the first cooling plate 615 into the upstream-side flowing section 6185 and the downstream-side flowing section 6186.

With such a configuration, compared with when the upstream-side flowing section 6185 and the downstream-side flowing section 6186 are respectively surrounded by different outer walls, it is possible to reduce the distance in the +Y direction between the upstream-side flowing section 6185 and the downstream-side flowing section 6186. Therefore, it is possible to reduce the first cooling plate 615 and the second cooling plate 625 in size.

In the light source device 4, the plurality of heat transfer sections 617 are provided along the +X direction in each of the upstream-side flowing section 6185 and the downstream-side flowing section 6186. That is, the plurality of heat transfer sections 617 include the plurality of upstream-side heat transfer sections 617A disposed in the upstream-side flowing section 6185 and aligned in the +X direction and the plurality of downstream-side heat transfer sections 617B disposed in the downstream-side flowing section 6186 and aligned in the +X direction.

With such a configuration, a pressure loss of the cooling liquid can be reduced in each of the upstream-side flowing section 6185 and the downstream-side flowing section 6186. Therefore, it is possible to further improve, without using a large pump, the cooling efficiency by the first cooling plate 615 to which the heat of the first light source module 611 is transferred via the first heat receiving plate 614. The same applies to the second cooling plate 625.

In the first light source section 61, in each of the upstream-side flowing section 6185 and the downstream-side flowing section 6186, it is possible to make it easy to transfer the heat generated in the first light source module 611 to the plurality of heat transfer sections 617. Therefore, the plurality of heat transfer sections 617 transfer heat to the cooling liquid, whereby it is possible to improve the cooling efficiency of the first light source module 611. The same applies to the second light source section 62.

In the light source device 4, the plurality of first heat receiving plates 614 include the upstream-side heat receiving plates 614A disposed to correspond to the upstream-side flowing section 6185 and the downstream-side heat receiving plates 614B disposed to correspond to the downstream-side flowing section 6186.

With such a configuration, the heat of the substrate 612, on which the light emitting elements 613 are disposed, can be transferred to, by the upstream-side heat receiving plate 614A, the heat transfer section 617 (the upstream-side heat transfer section 617A) disposed in the upstream-side flowing section 6185. Similarly, the heat of the substrate 612, on which the light emitting elements 613 are disposed, can be transferred to, by the downstream-side heat receiving plate 614B, the heat transfer section 617 (the downstream-side heat transfer section 617B) disposed in the downstream-side flowing section 6186. Consequently, it is possible to make it easy to transfer, with the upstream-side heat transfer section 617A and the downstream-side heat transfer section 617B, the heat generated in the first light source module 611 to the cooling liquid flowing in each of the upstream-side flowing section 6185 and the downstream-side flowing section 6186. Therefore, it is possible to improve the cooling efficiency of the first light source module 611. The same applies to the second light source section 62 having the same configuration as the configuration of the first light source section 61.

The first cooling plate 615 is a cooling plate, on the inside of which the cooling liquid is capable of flowing. The first cooling plate 615 includes the inflow section 6181, the outflow section 6182, the upstream-side flowing section 6185, the downstream-side flowing section 6186, and the plurality of heat transfer sections 617. The inflow section 6181 is provided in the +Y direction (the first direction). The cooling liquid flows into the inflow section 6181. The outflow section 6182 is provided in the −Y direction. The cooling liquid flows out from the outflow section 6182. The cooling liquid having flowed in from the inflow section 6181 flows to the upstream-side flowing section 6185 in the +X direction (the second direction). The cooling liquid having flowed in the upstream-side flowing section 6185 flows to the downstream-side flowing section 6186 in the −X direction. The plurality of heat transfer sections 617 are disposed side by side in the +X direction in each of the upstream-side flowing section 6185 and the downstream-side flowing section 6186. The plurality of heat transfer sections 617 include the plurality of fins 6171 and the plurality of channels 6172. The plurality of fins 6171 extend along the +X direction and are arrayed along the +Y direction. The plurality of channels 6172 are provided among the plurality of fins 6171. The cooling liquid is capable of flowing in the plurality of channels 6172. The plurality of heat transfer sections 617 are separated from one another in the +X direction.

With such a configuration, compared with when one heat transfer section corresponding to the length of the plurality of heat transfer sections 617 and the gaps in the +X direction is provided, since the channel 6172 extending along the +X direction can be reduced in the heat transfer sections 617, a pressure loss of the cooling liquid can be reduced. Consequently, since it is possible to allow the cooling liquid to easily flow in the plurality of heat transfer sections 617, it is possible to increase a flow rate of the cooling liquid in the first cooling plate 615 without using a large pump. Therefore, it is possible to improve cooling efficiency by the first cooling plate 615. The same applies to the second cooling plate 625 having the same configuration as the configuration of the first cooling plate 615.

Modification of the First Embodiment

In the light source section 6 explained above, each of the first light source module 611 and the second light source module 621 includes the three upstream-side substrates 612A and the three downstream-side substrates 612B. However, not only this, but the number of the upstream-side substrates 612A and the number of the downstream-side substrates 612B included in the first light source module 611 can be changed as appropriate. The number of the upstream-side substrates 612A and the number of the downstream-side substrates 612B included in the second light source module 621 can also be changed as appropriate.

Figure 10:
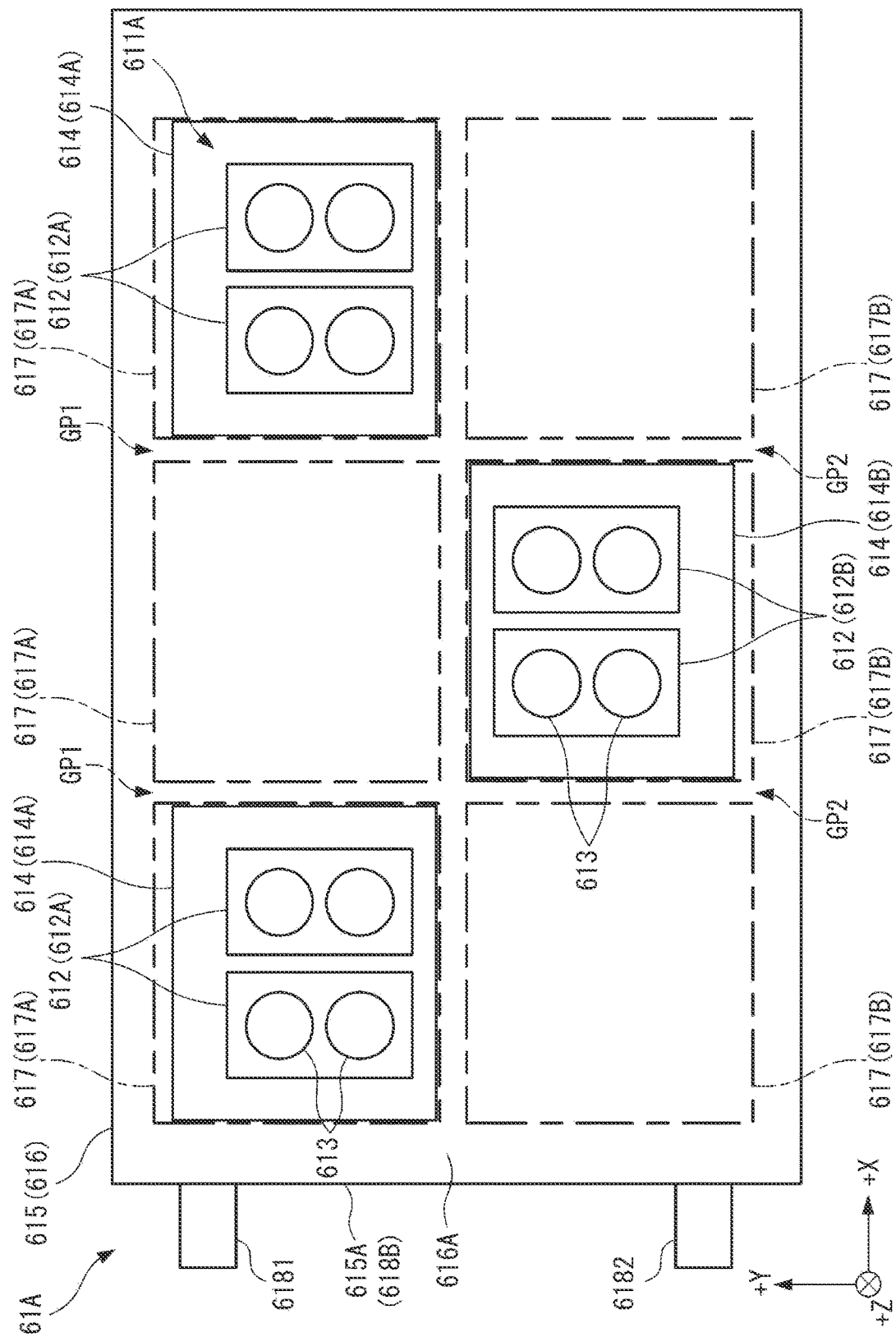
FIG. 10 is a schematic diagram showing a modification of the first light source section according to the first embodiment.

FIG. 10 is a schematic diagram of a first light source section 61A, which is a modification of the first light source section 61, viewed from the emission side of the light source light.

For example, the first light source section 61A shown in FIG. 10 may be adopted in the light source section 6 instead of the first light source section 61.

The first light source section 61A includes a first light source module 611A, the plurality of first heat receiving plates 614, and the first cooling plate 615.

In the first light source section 61A, three first light receiving plates 614 are provided. The three first heat receiving plates 614 include two upstream-side heat receiving plates 614A and one downstream-side heat receiving plate 614B.

Of the two upstream-side heat receiving plates 614A, one upstream-side heat receiving plate 614A is disposed to correspond to one upstream-side heat transfer section 617A in the −X direction among the three upstream-side heat transfer sections 617A. The other one upstream-side heat receiving plate 614A is disposed to correspond to one upstream-side heat transfer section 617A in the +X direction among the three upstream-side heat transfer sections 617A.

The one downstream-side heat receiving plate 614B is disposed to correspond to the downstream-side heat transfer section 617B in the center in the +X direction among the three downstream-side heat transfer sections 617B.

The first light source module 611A emits the light source light in the −Z direction. The first light source module 611A includes a plurality of substrates 612 on which the light emitting elements 613 are provided. Specifically, the first light source module 611A includes a plurality of substrates 612 including four upstream-side substrates 612A and two downstream-side substrates 612B.

Among the four upstream-side substrates 612A, two upstream-side substrates 612A are disposed on the upstream-side heat receiving plate 614A in the −X direction. The other two upstream-side substrates 612A are disposed on the upstream-side heat receiving plate 614A in the +X direction. The two downstream-side substrates 612B are disposed on one downstream-side heat receiving plate 614B.

With the light source device 4 including such a first light source section 61A instead of the first light source section 61, the same effects as the effects of the light source device 4 including the first light source section 61 can be achieved.

The second light source section 62 may have the same configuration as the first light source section 61A.

Second Embodiment

A second embodiment of the present disclosure is explained.

A projector according to this embodiment has the same configuration as the configuration of the projector 1 according to the first embodiment but is different from the projector 1 in that the configuration of a substrate and the configuration of a heat receiving plate included in a light source device are different. In the following explanation, the same or substantially the same portions as the portions explained above are denoted by the same reference numerals and signs and explanation of the portions is omitted.

Schematic Configurations of the Projector and the Light Source Device

Figure 11:
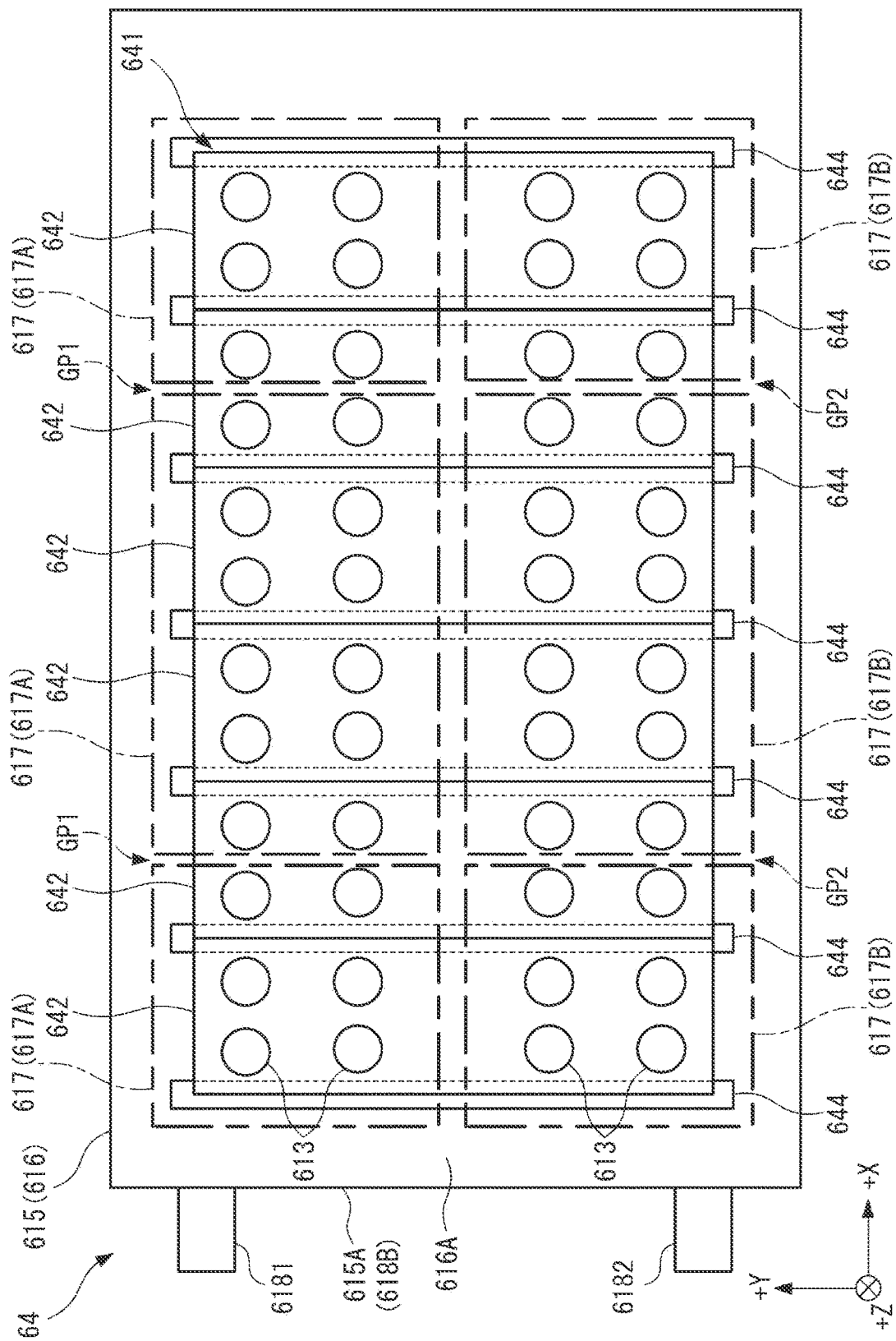
FIG. 11 is a schematic diagram showing a first light source section of a light source device included in a projector according to a second embodiment.

FIG. 11 is a schematic diagram of a first light source section 64 of the light source device 4 included in the projector according to this embodiment viewed from an emission side of light source light.

The projector according to this embodiment includes the same components and the same functions as the components and the functions of the projector 1 according to the first embodiment except that the projector according to this embodiment includes the first light source section 64 shown in FIG. 11 instead of the first light source section 61 according to the first embodiment. That is, the light source device 4 according to this embodiment includes the same components and the same functions as the components and the functions of the light source device 4 according to the first embodiment except that the light source device 4 according to this embodiment includes the first light source section 64 instead of the first light source section 61 according to the first embodiment.

Configuration of the First Light Source Section

Like the first light source section 61, the first light source section 64 emits the light source light, which is the blue light BLs, in the −Z direction. The first light source section 64 includes a first light source module 641, a plurality of first heat receiving plates 644, and the first cooling plate 615.

Configuration of the First Light Source Module

The first light source module 641 includes a plurality of substrates 642. In this embodiment, the first light source module 641 includes six substrates 642 aligned in the +X direction.

The plurality of substrates 642 are disposed side by side in the +X direction across positions corresponding to an upstream-side flowing section and positions corresponding to a downstream-side flowing section on the first cooling plate 615.

Each of the plurality of substrates 642 supports the plurality of light emitting elements 613 disposed in a matrix shape in the +X direction and the +Y direction. Specifically, in one substrate 642, eight light emitting elements 613 in total are disposed; two being disposed in the +X direction and four being disposed in the +Y direction. Among the eight light emitting elements 613 provided on one substrate 642, four light emitting elements 613 in the +Y direction are disposed in positions corresponding to the upstream-side flowing section and four light emitting elements 613 in the −Y direction are disposed in positions corresponding to the downstream-side flowing section. The upstream-side flowing section and the downstream-side flowing section have the same configurations as the configurations of the upstream-side flowing section 6185 and the downstream-side flowing section 6186 shown in FIG. 5 in the first embodiment.

Configuration of the First Heat Receiving Plate

The plurality of first heat receiving plates 644 are provided between the first light source module 641 and the first cooling plate 615 and support the substrates 642. The dimension of the first heat receiving plate 644 in the +X direction is smaller than the dimension of the substrate 642 in the +X direction.

The plurality of first heat receiving plates 644 are disposed side by side in the +X direction. Each of the plurality of first heat receiving plates 644 is coupled to the end portion in the +X direction of the substrate 642 corresponding thereto among the plurality of substrates 642.

Specifically, the first heat receiving plate 644 disposed at the end in the +X direction is coupled to the end portion in the +X direction of the substrate 642 disposed at the end in the +X direction. The first heat receiving plate 644 disposed at the end in the −X direction is coupled to the end portion in the −X direction of the substrate 642 disposed at the end in the −X direction. Each of the other first heat receiving plates 644 is disposed between two substrates 642 adjacent to each other such that the other first heat receiving plate 644 is coupled to the end portion in the −X direction of the substrate 642 provided in the +X direction and the end portion in the +X direction of the substrate 642 provided in the −X direction of the two substrates 642 adjacent to each other. In other words, each of the first heat receiving plates 644 is disposed between the two light emitting elements 613 adjacent to each other in the +X direction among the plurality of light emitting elements 613 included in the first light source module 641.

In this way, each of the plurality of first heat receiving plates 644 is coupled to the end portion in the +X direction of the substrate 642 corresponding thereto among the plurality of substrates 642.

Like the substrate 642, each of the plurality of first heat receiving plates 644 is provided across a position corresponding to the upstream-side flowing section in the first cooling plate 615 and a position corresponding to the downstream-side flowing section in the first cooling plate 615. The dimension of the first heat receiving plate 644 in the +Y direction is larger than the dimension of the substrate 642 in the +Y direction. Accordingly, the end portion in the +Y direction in the first heat receiving plate 644 is located farther in the +Y direction than the end portion in the +Y direction in the substrate 642 corresponding thereto. The end portion in the −Y direction in the first heat receiving plate 644 is located further in the −Y direction than the end portion in the −Y direction in the substrate 642 corresponding thereto.

In this embodiment, seven first heat receiving plates 644 are provided.

In such a first light source section 64, the gaps GP1 and GP2 of the first cooling plate 615 are located among the plurality of first heat receiving plates 644. That is, the plurality of heat transfer sections 617 are separated among the plurality of first heat receiving plates 644.

Specifically, the gap GP1 in the −X direction is located between the first heat receiving plate 644 located second when counted from the end in the −X direction and the first heat receiving plate 644 located third when counted from the end in the −x direction. The gap GP1 in the +X direction is located between the first heat receiving plate 644 located second when counted from the end in the +X direction and the first heat receiving plate 644 located third when counted from the end in the +X direction.

Similarly, the gap GP2 in the −X direction is located between the first heat receiving plate 644 located second when counted from the end in the −X direction and the first heat receiving plate 644 located third when counted from the end in the −X direction. The gap GP2 in the +X direction is located between the first heat receiving plate 644 located second when counted from the end in the +X direction and the first heat receiving plate 644 located third when counted from the end in the +X direction.

In this way, the gaps GP1 are located and the plurality of upstream-side heat transfer sections 617A are separated from one another and the gaps GP2 are located and the plurality of downstream-side heat transfer sections 617B are separated from one another.

Consequently, a pressure loss of the cooling liquid flowing in the upstream-side flowing section 6185 (see FIG. 5) and the downstream-side flowing section 6186 (see FIG. 5) can be reduced. Besides, the heat of the plurality of substrates 642 can be efficiently transferred to the upstream-side heat transfer section 617A and the downstream-side heat transfer section 617B via the plurality of first heat receiving plates 644. Therefore, it is possible to allow the cooling liquid to easily flow. It is possible to improve cooling efficiency of the light emitting elements 613 by the first cooling plate 615.

The second light source section 62 may have the same configuration as the configuration of the first light source section 64. In this case, a pressure loss of the cooling liquid can be reduced in the second light source section 62 as well. It is possible to allow the cooling liquid to easily flow in the second cooling plate 625. It is possible to improve cooling efficiency of the light emitting elements 613 by the second cooling plate 625.

The plurality of heat transfer sections 617 are separated in positions corresponding thereto among not all of the plurality of first heat receiving plates 644 aligned in the +X direction because of a pressure loss of the cooling liquid. The plurality of heat transfer sections 617 are separated from one another in positions corresponding to positions among predetermined first heat receiving plates 644. That is, the gaps GP1 may not be provided to correspond to all portions among the plurality of first heat receiving plates 644 aligned in the +X direction.

The positions where the plurality of heat transfer sections 617 are separated in the upstream-side heat transfer section 617A and the positions where the plurality of heat transfer sections 617 are separated in the downstream-side heat transfer section 617B are not limited to the same positions and may be different.

Effects of the Second Embodiment

The projector according to this embodiment explained above achieves the following effects besides achieving the same effects as the effects of the projector 1 according to the first embodiment.

The light source device 4 included in the projector according to this embodiment includes the light source section 6. The light source section 6 includes the first light source section 64 and the second light source section 62. The first light source section 64 includes the first light source module 641 including the plurality of substrates 642, the plurality of first heat receiving plates 644, and the first cooling plate 615.

The plurality of substrates 642 are disposed side by side in the +X direction (the second direction). The plurality of first heat receiving plates 644 are disposed side by side in the +X direction and coupled to the end portions in the +X direction of the substrates 642 corresponding thereto among the plurality of substrates 642. The plurality of first heat receiving plates 644 are equivalent to the plurality of heat receiving plates.

With such a configuration, heat generated in the substrate 642 is transferred to the first cooling plate 615 via the first heat receiving plate 644 coupled to the end portion of the substrate 642. Since the plurality of heat transfer sections 617 are separated from one another among the plurality of first heat receiving plates 644 in the +X direction, the heat transfer section 617 is present in a coupling part to the first heat receiving plate 644 in the first cooling plate 615. Accordingly, heat generated in the substrate 642 can be transferred to the heat transfer section 617 via the first heat receiving plate 644. Therefore, cooling efficiency of the first light source module 641 including the plurality of substrates 642 can be improved.

Modification of the Second Embodiment

In the first light source section 64 explained above, the plurality of first heat receiving plates 644 are coupled to the end portions in the +X direction of the substrates 642. However, not only this, but the plurality of first heat receiving plates 644 may be coupled to the centers in the +X direction of the substrates 642.

Figure 12:
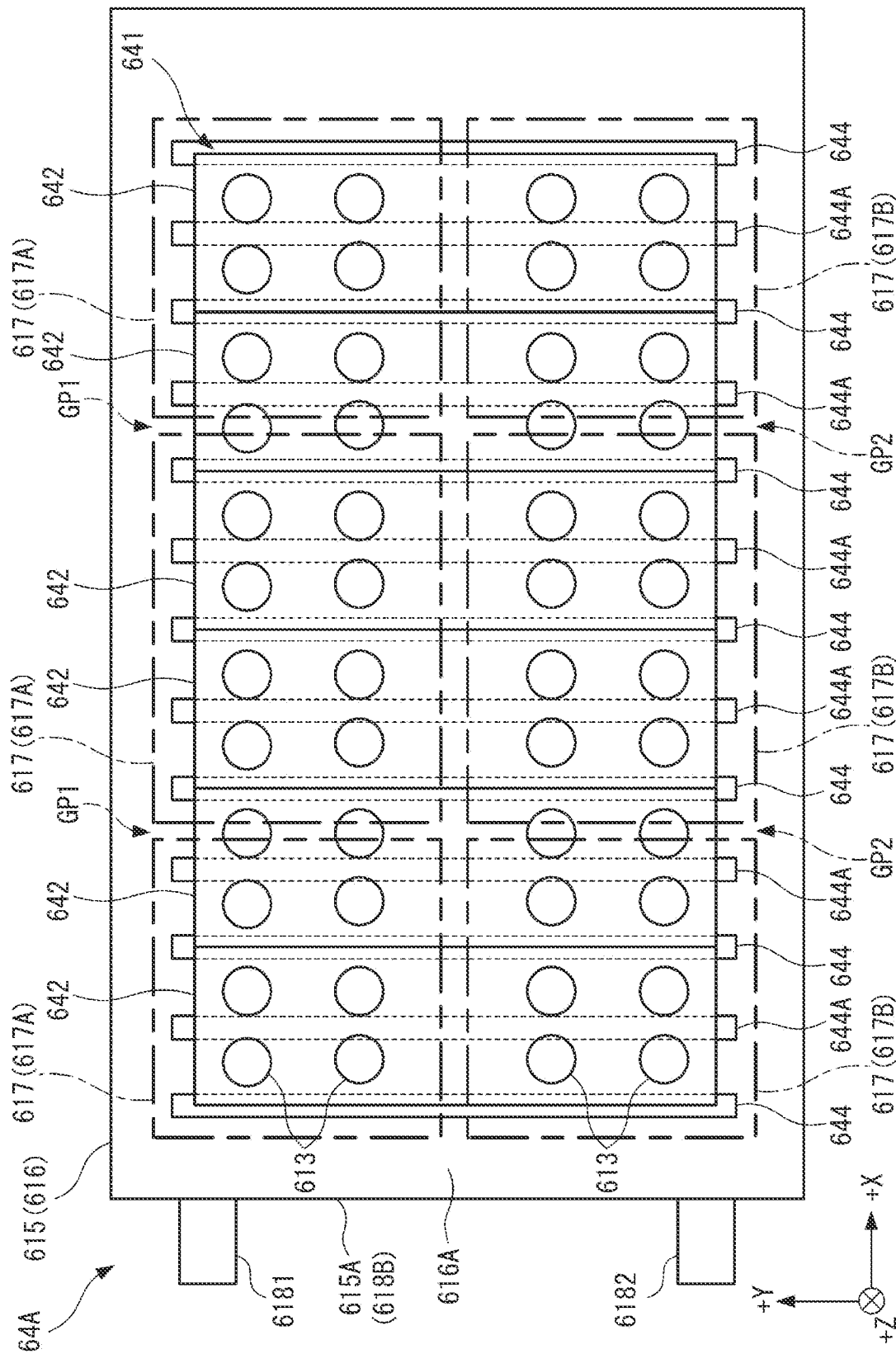
FIG. 12 is a schematic diagram showing a modification of the first light source section according to the second embodiment.

FIG. 12 is a schematic diagram of a first light source section 64A, which is a modification of the first light source section 64, viewed from the emission side of the light source light.

For example, the first light source section 64A shown in FIG. 12 may be adopted instead of the first light source section 64.

The first light source section 64A includes a plurality of first heat receiving plates 644A in addition to the same components as the components of the first light source section 64. The first heat receiving plate 644A is also equivalent to the heat receiving plate.

Like the first heat receiving plate 644, each of the plurality of first heat receiving plates 644A supports the substrate 642 and transfers, to the first cooling plate 615, heat transferred from the substrate 642. The plurality of first heat receiving plates 644A are provided among the plurality of first heat receiving plates 644. The dimension of the first heat receiving plate 644A in the +X direction is the same as the dimension of the first heat receiving plate 644 in the +X direction. The dimension of the first heat receiving plate 644A in the +Y direction is the same as the dimension of the first heat receiving plate 644 in the +Y direction.

In such a first light source section 64A, the gaps GP1 and GP2 among the plurality of heat transfer sections 617 included in the first cooling plate 615 are located in positions corresponding to positions between the first heat receiving plates 644 and the first heat receiving plates 644A. That is, the plurality of heat transfer sections 617 are separated from one another in portions corresponding to the positions between the first heat receiving plates 644 and the first heat receiving plates 644A.

Specifically, the gap GP1 in the −X direction is located between the first heat receiving plate 644A located second when counted from the end in the −X direction and the first heat receiving plate 644 located third when counted from the end in the −X direction. The gap GP1 in the +X direction is located between the first heat receiving plate 644A located second when counted from the end in the +X direction and the first heat receiving plate 644 located third when counted from the end in the +X direction.

In this way, in this embodiment, the gaps GP1 are located in positions corresponding to the light emitting elements 613. The plurality of upstream-side heat transfer sections 617A are separated from one another in the positions corresponding to the light emitting elements 613. In other words, the plurality of heat transfer sections 617 disposed in the upstream-side flowing section 6185 (see FIG. 5) are separated from one another in positions not overlapping the light emitting elements 613.

Similarly, the gap GP2 in the −X direction is located between the first heat receiving plate 644A located second when counted from the end in the −X direction and the first heat receiving plate 644 located third when counted from the end in the −X direction. The gap GP2 in the +X direction is located between the first heat receiving plate 644A located second when counted from the end in the +X direction and the first heat receiving plate 644 located third when counted from the end in the +X direction.

In this way, in this embodiment, the gaps GP2 are located in the positions corresponding to the light emitting elements 613 and the plurality of downstream-side heat transfer sections 617B are separated from one another in the positions corresponding to the light emitting elements 613. In other words, the plurality of heat transfer sections 617 disposed in the downstream-side flowing sections 6186 (see FIG. 5) are separated from one another in the positions corresponding to the light emitting elements 613.

The light source device 4 including the first light source section 64A explained above achieves the following effects besides achieving the same effects as the effects of the light source device 4 including the first light source section 64.

In the first light source section 64A included in the light source device 4, the plurality of heat transfer sections 617 are separated from one another in positions not overlapping the light emitting elements 613.

With such a configuration, even if the plurality of heat transfer sections 617 are separated from one another in the positions corresponding to the light emitting elements 613, the heat of the plurality of substrates 642 can be transferred to the plurality of heat transfer sections 617 via the plurality of first heat receiving plates 644 and 644A. Accordingly, it is possible to make it easy to optionally set the number of the light emitting elements 613 disposed on the substrate 642. Besides, it is possible to improve layout flexibility of the light emitting elements 613 on the substrate 642. Therefore, it is possible to improve design flexibility of the first light source module 641.

The second light source section 62 may have the same configuration as the configuration of the first light source section 61A. The first light source section 64 may be configured not to include the plurality of first heat receiving plates 644 but include the plurality of first heat receiving plates 644A.

Third Embodiment

A third embodiment of the present disclosure is explained.

A projector according to this embodiment has the same configuration as the configuration of the projector according to the second embodiment but is different in the configuration of a heat receiving plate that transfers heat generated in the plurality of substrates 642 to the first cooling plate 615. In the following explanation, the same or substantially the same portions as the portions explained above are denoted by the same reference numerals and signs and explanation of the portions is omitted.

Schematic Configurations of the Projector and the Light Source Device

Figure 13:
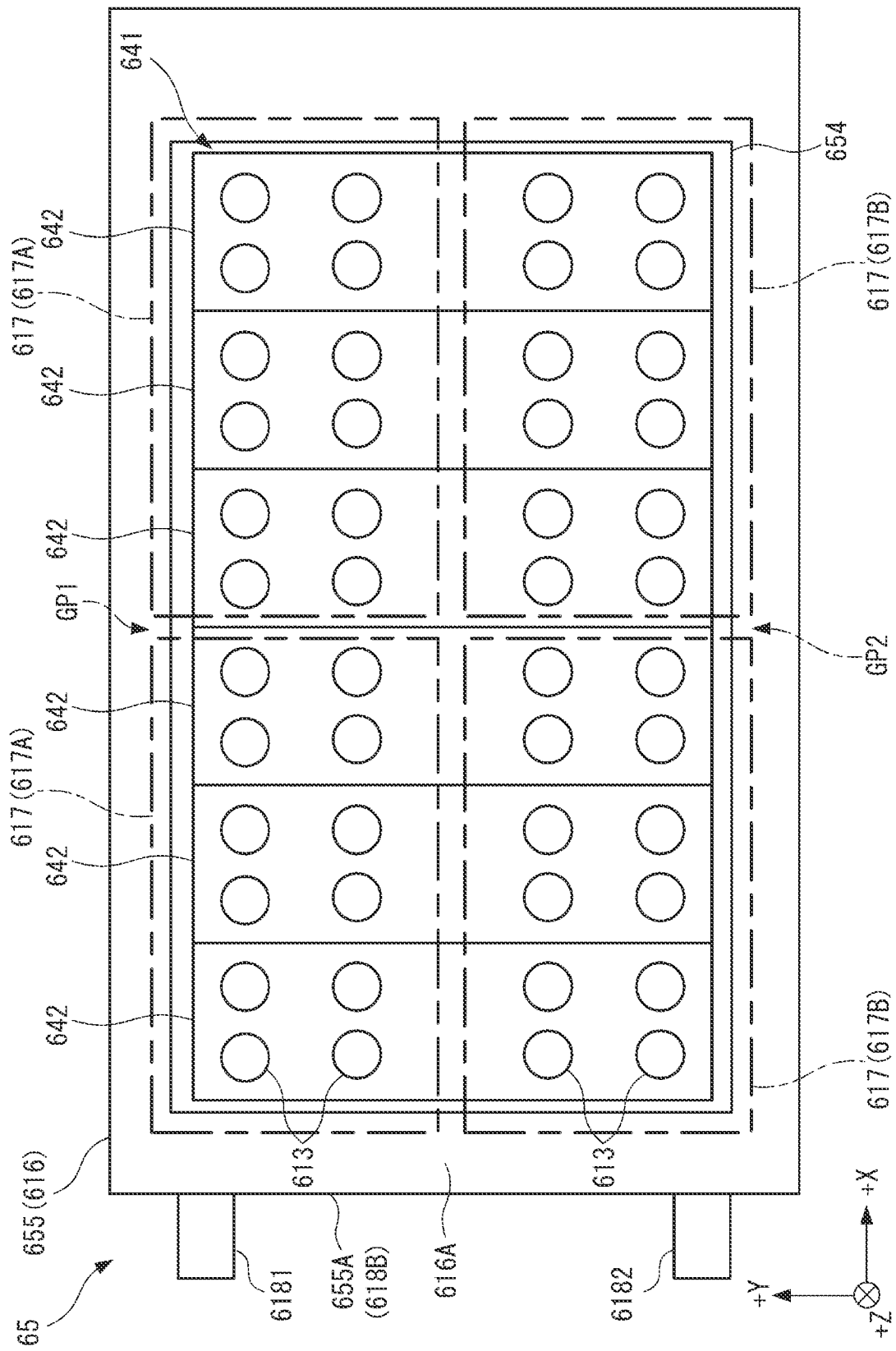
FIG. 13 is a schematic diagram showing a first light source section of a light source device included in a projector according to a third embodiment.

FIG. 13 is a schematic diagram of a first light source section 65 of the light source device 4 included in the projector according to this embodiment viewed from an emission side of light source light.

The projector according to this embodiment includes the same components and the same functions as the components and the functions of the projector 1 according to the first embodiment except that the projector according to this embodiment includes the first light source section 65 shown in FIG. 13 instead of the first light source section 61 according to the first embodiment. That is, the light source device 4 according to this embodiment includes the same components and the same functions as the components and the functions of the light source device 4 according to the first embodiment except that the light source device 4 according to this embodiment includes the first light source section 65 instead of the first light source section 61.

Configuration of the First Light Source Section

Like the first light source section 61, the first light source section 65 emits the light source light, which is the blue light BLs, in the −Z direction. The first light source section 65 includes the first light source module 641, a first heat receiving plate 654, and a first cooling plate 655. That is, in this embodiment, the first light source section 65 includes one first heat receiving plate 654.

As explained above, the first light source module 641 includes the plurality of substrates 642 aligned in the +X direction. Each of the plurality of substrates 642 includes the plurality of light emitting elements 613 disposed in a matrix shape along the +X direction and the +Y direction.

Configuration of the First Heat Receiving Plate

The first heat receiving plate 654 is equivalent to the heat receiving plate. The first heat receiving plate 654 is formed larger than the first light source module 641 when viewed from the −Z direction and supports the plurality of substrates 642. The first heat receiving plate 654 are disposed across the upstream-side flowing section 6185 and the downstream-side flowing section 6186 shown in FIG. 5 in the first cooling plate 615.

Configuration of the First Cooling Plate

Like the first cooling plate 615 according to the first embodiment, the first cooling plate 655 cools the plurality of light emitting elements 613 by transferring, to the cooling liquid flowing on the inside, the heat of the plurality of light emitting elements 613 transferred from the plurality of substrates 642 via the first heat receiving plate 654.

The first cooling plate 655 includes the same components and the same functions as the components and the functions of the first cooling plate 615.

However, whereas the first cooling plate 615 includes the plurality of heat transfer sections 617 including the three upstream-side heat transfer sections 617A and the three downstream-side heat transfer sections 617B, the first cooling plate 655 includes a plurality of heat transfer sections 617 including two upstream-side heat transfer sections 617A and two downstream-side heat transfer sections 617B.

The inflow section 6181 of the first cooling plate 655 is provided, at an end portion 655A of the first cooling plate 655 in the −X direction, in a part in the +Y direction extending along the end portion 655A. The outflow section 6182 of the first cooling plate 655 is provided, at the end portion 655A, a part in the −Y direction with respect to the part in the +Y direction where the inflow section 6181 is provided. The end portion 618B of the second plate element 618 configures the end portion 655A.

In the first light source section 65, the gaps GP1 and GP2 among the plurality of heat transfer sections 617 included in the first cooling plate 615 are located in positions corresponding to positions between two substrates 642 adjacent to each other in the +X direction. Specifically, the gaps GP1 and GP2 are located in positions corresponding to positions between the light emitting elements 613 included in the two substrates 642 adjacent to each other in the +X direction among the plurality of substrates 642. That is, the plurality of heat transfer sections 617 are separated from each other in a position corresponding to a position between two light emitting elements 613 that are provided on two substrates 642 adjacent to each other in the +X direction and are adjacent to each other in the +X direction.

Specifically, the gap GP1 between two upstream-side heat transfer sections 617A is located in a position corresponding to a position between two substrates 642 located in the center in the +X direction. That is, the two upstream-side heat transfer sections 617A are separated in a position corresponding to the position between the two substrates 642 located in the center in the +X direction. In other words, the two upstream-side heat transfer sections 617A are separated in a position corresponding to a position between the light emitting element 613 disposed in the +X direction on the substrate 642 in the −X direction of the two substrates 642 located in the center in the +X direction and the light emitting element 613 disposed in the −X direction on the substrate 642 in the +X direction of the two substrates 642.

Similarly, the gap GP2 between two downstream-side heat transfer sections 617B is located in a position corresponding to the position between two substrates 642 located in the center in the +X direction. That is, the two downstream-side heat transfer sections 617B are separated in a position corresponding to the position between the two substrates 642 located in the center in the +X direction. In other words, the two downstream-side heat transfer sections 617B are separated in a position corresponding to the position between the light emitting element 613 disposed in the +X direction on the substrate 642 in the −X direction of the two substrates 642 located in the center in the +X direction and the light emitting element 613 disposed in the −X direction on the substrate 642 in the +X direction of the two substrates 642.

Since the gaps GP1 and GP2 are located in this way, a pressure loss of the cooling liquid flowing in the upstream-side flowing section 6185 and the downstream-side flowing section 6186 shown in FIG. 5 can be reduced. The heat of the plurality of substrates 642 can be efficiently transferred to the upstream-side heat transfer section 617A and the downstream-side heat transfer section 617B via the first heat receiving plate 654. Therefore, it is possible to allow the cooling liquid to easily flow. It is possible to improve cooling efficiency of the light emitting elements 613 by the first cooling plate 655.

The positions where the gaps GP1 and GP2 are set may not be the portions between the same two substrates 642. For example, the gap GP1 may be located in a position corresponding to a position between substrate 642 located second when counted from the end in the +X direction and the substrate 642 located third when counted from the end in the +X direction. The gap GP2 may be located in a position corresponding to a position between the substrate 642 located fourth when counted from the end in the +X direction and the substrate 642 located fifth when counted from the end in the +X direction.

For example, one gap of the gaps GP1 and GP2 may be disposed in a position corresponding to a position between two light emitting elements 613 adjacent to each other in the +X direction on one substrate 642.

Effects of the Third Embodiment

The projector according to this embodiment explained above achieves the same effects as the effects of the projector 1 according to the first embodiment.

That is, the light source device 4 included in the projector according to this embodiment includes the light source section 6. The light source section 6 includes the first light source section 65 and the second light source section 62. The first light source section 65 includes the first light source module 641, one first heat receiving plate 654, and the first cooling plate 655. The first light source module 641 is equivalent to the light source module. The first light source module 641 includes the plurality of substrates 642 on which the light emitting elements 613 are disposed. The first heat receiving plate 654 is equivalent to the heat receiving plate and is coupled to the first light source module 641. The first cooling plate 655 is equivalent to the cooling plate and is coupled to the first heat receiving plate 654. The cooling liquid flows on the inside of the first cooling plate 655.

The first cooling plate 655 includes the inflow section 6181, the outflow section 6182, the upstream-side flowing section 6185, the downstream-side flowing section 6186, and the plurality of heat transfer sections 617. The inflow section 6181 is provided in a part in the +Y direction (the first direction) extending along the end portion 618B. The cooling liquid flows into the inflow section 6181. The outflow section 6182 is provided in a part in the −Y direction with respect to the part in the +Y direction where the inflow section 6181 is provided at the end 618B. The cooling liquid flows out from the outflow section 6182. In the upstream-side flowing section 6185, the cooling liquid having flowed in from the inflow section 6181 flows in the +X direction (the second direction). In the downstream-side flowing section 6186, the cooling liquid having flowed in the upstream-side flowing section 6185 flows in the −X direction. The plurality of heat transfer sections 617 are provided in each of the upstream-side flowing section 6185 and the downstream-side flowing section 6186 and are disposed side by side in the +X direction. The plurality of heat transfer sections 617 include the plurality of fins 6171 and the plurality of channels 6172. The plurality of fins 6171 extend along the +X direction and are arrayed along the +Y direction. The plurality of channels 6172 are channels provided among the plurality of fins 6171, the cooling liquid being capable of flowing in the channels. The plurality of substrates 642 are disposed side by side in the +X direction. The plurality of heat transfer sections 617 are separated from each other in a position corresponding to a position between the two light emitting elements 613 among the plurality of light emitting elements 613 aligned in the +X direction. In other words, the plurality of heat transfer sections 617 are separated from each other in a position not overlapping two light emitting elements 613 among the plurality of light emitting elements 613 aligned in the +X direction.

With such a configuration, as in the first cooling plate 615, a pressure loss of the cooling liquid flowing in the first cooling plate 655 can be reduced. Accordingly, since it is possible to allow the cooling liquid to easily flow in the plurality of heat transfer sections 617, it is possible to increase a flow rate of the cooling liquid in the first cooling plate 655 without using a large pump. Therefore, it is possible to improve cooling efficiency by the first cooling plate 655 to which the heat of the first light source module 641 is transferred via the first heat receiving plate 654.

Positions where the plurality of heat transfer sections 617 are separated from one another can be located in positions where heat is less easily transferred from the plurality of light emitting elements 613 to the first cooling plate 655. It is possible to make it easy to transfer the heat of the plurality of light emitting elements 613 to the plurality of heat transfer sections 617. Therefore, it is possible to improve cooling efficiency of the first light source module 641.

The second light source section 62 may have the same configuration as the configuration of the first light source section 65. In this case, a pressure loss of the cooling liquid can be reduced in the second light source section 62 as well. It is possible to allow the cooling liquid to easily flow in the second cooling plate 625. It is possible to improve cooling efficiency of the light emitting elements 613 by the second cooling plate 625.

The positions of the gaps GP1 and GP2 may be other positions. That is, two upstream-side heat transfer sections 617A adjacent to each other in the +X direction only have to be separated from each other between two substrates 642 or two light emitting elements 613 adjacent to each other in the +X direction. The positions of the gaps GP1 and the number of the upstream-side heat transfer sections 617A do not matter. Similarly, two downstream-side heat transfer sections 617B adjacent to each other in the +X direction only have to be separated from each other between two substrates 642 or two light emitting elements 613 adjacent to each other in the +X direction. The positions of the gaps GP2 and the number of the downstream-side heat transfer sections 617B do not matter.

Fourth Embodiment

A fourth embodiment of the present disclosure is explained.

A projector according to this embodiment has the same configuration as the configuration of the projector 1 according to the first embodiment but is different in that a heat receiving plate corresponding to an upstream-side flowing section and a heat receiving plate corresponding to a downstream-side flowing section on a cooling plate are provided. In the following explanation, the same or substantially the same portions as the portions explained above are denoted by the same reference numerals and signs and explanation of the portions is omitted.

Schematic Configurations of the Projector and the Light Source Device

Figure 14:
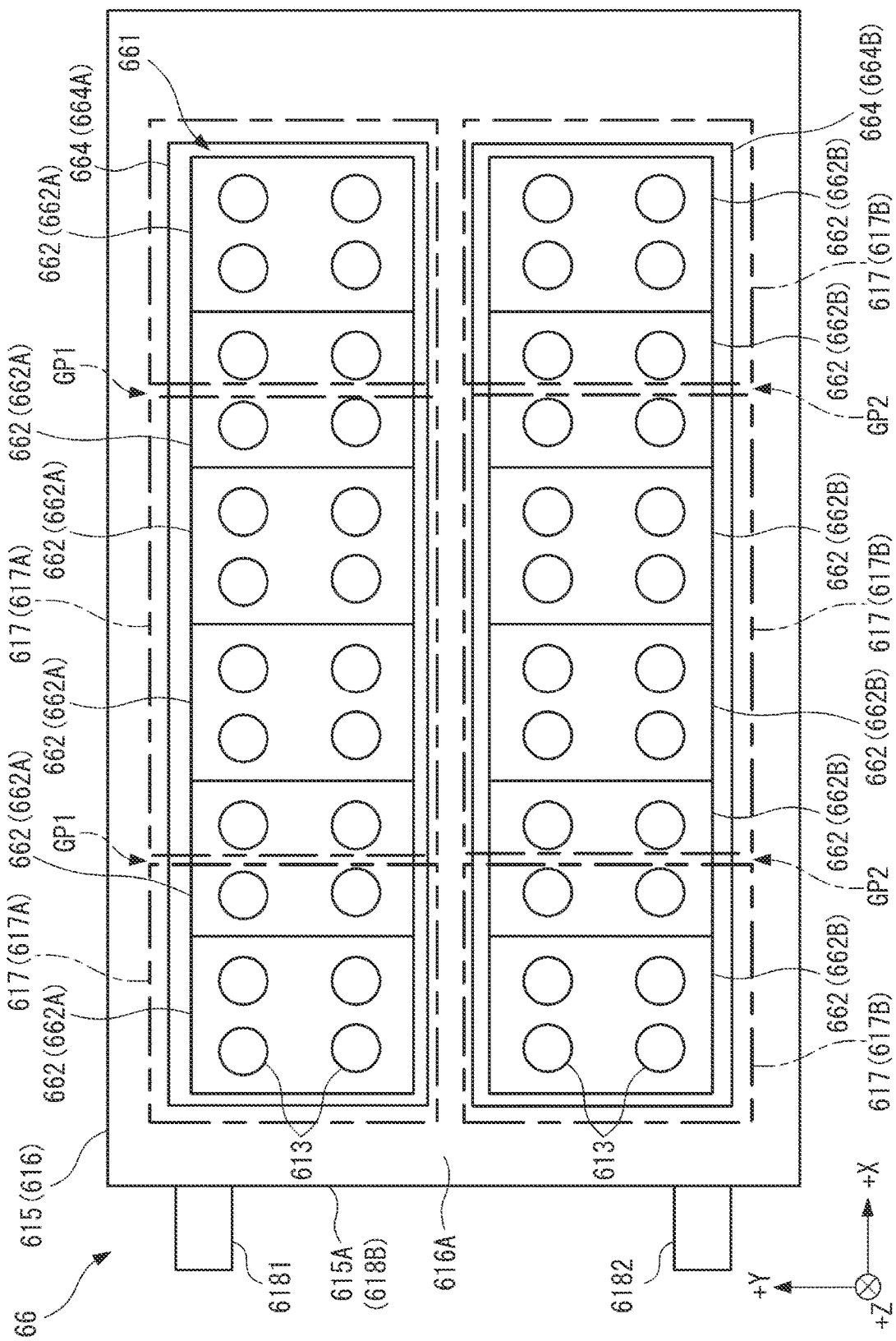
FIG. 14 is a schematic diagram showing a first light source section of a light source device included in a projector according to a fourth embodiment.

FIG. 14 is a schematic diagram of a first light source section 66 of the light source device 4 included in the projector according to this embodiment viewed from an emission side of light source light.

The projector according to this embodiment includes the same components and the same functions as the components and the functions of the projector 1 according to the first embodiment except that the projector according to this embodiment includes the first light source section 66 shown in FIG. 14 instead of the first light source section 61 according to the first embodiment. That is, the light source device 4 according to this embodiment includes the same components and the same functions as the components and the functions of the light source device 4 according to the first embodiment except that the light source device 4 according to this embodiment includes the first light source section 66 instead of the first light source section 61 according to the first embodiment.

Configuration of the First Light Source Section

Like the first light source section 61, the first light source section 66 emits the light source light, which is the blue light BLs, in the −Z direction. The first light source section 66 includes a first light source module 661, a plurality of first heat receiving plates 664, and the first cooling plate 615.

Configuration of the First Light Source Module

The first light source module 661 includes a plurality of substrates 662 aligned in the +X direction. Each of the plurality of substrates 662 includes a plurality of light emitting elements 613 disposed in a matrix shape along the +X direction and the +Y direction. In this embodiment, each of the plurality of substrates 662 includes two light emitting elements 613 in the +X direction, includes two light emitting elements 613 in the +Y direction, and includes four light emitting elements 613 in total.

The plurality of substrates 662 include a plurality of upstream-side substrates 662A disposed to correspond to the upstream-side flowing section 6185 (see FIG. 5) of the first cooling plate 615 and aligned in the +X direction and a plurality of downstream-side substrates 662B disposed to correspond to the downstream-side flowing section 6186 (see FIG. 5) and aligned in the +X direction. In this embodiment, the number of the upstream-side substrates 662A is six and the number of the downstream-side substrates 662B is six.

Configuration of the First Heat Receiving Plate

The plurality of first heat receiving plates 664 support the plurality of substrates 662 and transfer, to the first cooling plate 615, heat transferred from the plurality of substrates 662. The plurality of first heat receiving plates 664 include one upstream-side heat receiving plate 664A disposed on the first surface 616A to correspond to the upstream-side flowing section 6185 of the first cooling plate 615 and one downstream-side heat receiving plate 664B disposed on the first surface 616A to correspond to the downstream-side flowing section 6186.

The upstream-side heat receiving plate 664A supports six upstream-side substrates 662A. When viewed from the −Z direction, the upstream-side heat receiving plate 664A is larger than the six upstream-side substrates 662A and smaller than the upstream-side flowing section 6185.

The downstream-side heat receiving plate 664B supports six downstream-side substrates 662B. When viewed from the −Z direction, the downstream-side heat receiving plate 664B is larger than six downstream-side substrates 662B and smaller than the downstream-side flowing section 6186.

In the first light source section 66, the gaps GP1 and GP2 among the plurality of heat transfer sections 617 included in the first cooling plate 615 are located in positions corresponding to positions between the light emitting elements 613 included in one substrate 662 among the plurality of substrates 662. That is, the plurality of heat transfer sections 617 are separated from each other in a position corresponding to a position between two light emitting elements 613 adjacent to each other in the +X direction on one substrate 662.

Specifically, the gap GP1 in the −X direction is located in a position corresponding to a position between two light emitting elements 613 adjacent to each other in the +X direction on the upstream-side substrate 662A located second when counted from the end in the −X direction. That is, two upstream-side heat transfer sections 617A in the −X direction are separated from each other in a position corresponding to the position between the two light emitting elements 613 adjacent to each other in the +X direction on the upstream-side substrate 662A located second when counted from the end in the −X direction.

The gap GP1 in the +X direction is located in a position corresponding to a position between two light emitting elements 613 adjacent to each other in the +X direction on the upstream-side substrate 662A located second when counted from the end in the +X direction. That is, two upstream-side heat transfer sections 617A in the +X direction are separated from each other in a position corresponding to the position between the two light emitting elements 613 adjacent to each other in the +X direction on the upstream-side substrate 662A located second when counted from the end in the +X direction.

Two gaps GP2 among three downstream-side heat transfer sections 617B are also located in the same manner as the two gaps GP1. That is, positions where the three downstream-side heat transfer sections 617B are separated from one another are the same as the positions where the three upstream-side heat transfer sections 617A are separated from one another.

Since the gaps GP1 and GP2 are located in this way, a pressure loss of the cooling liquid flowing in the upstream-side flowing section 6185 and the downstream-side flowing section 6186 shown in FIG. 5 can be reduced. Besides, the heat of the plurality of upstream-side substrates 662A can be efficiently transferred to the upstream-side heat transfer section 617A via the upstream-side heat receiving plate 664A. The heat of the plurality of downstream-side substrates 662B can be efficiently transferred to the downstream-side heat transfer section 617B via the downstream-side heat receiving plate 664B. Therefore, it is possible to allow the cooling liquid to easily flow. It is possible to improve cooling efficiency of the light emitting elements 613 by the first cooling plate 615.

In this embodiment, the position where the two heat transfer sections 617 adjacent to each other in the +X direction are separated, that is, the position of the gaps GP1 and GP2 is the position corresponding to the position between the light emitting elements 613 adjacent to each other in the +X direction. However, not only this, but the position of the gaps GP1 and GP2 may be a position corresponding to a position between the substrates 662 adjacent to each other in the +X direction.

Effects of the Fourth Embodiment

The projector according to this embodiment explained above achieves the same effects as the effects of the projector 1 according to the first embodiment.

That is, the light source device 4 included in the projector according to this embodiment includes the light source section 6. The light source section 6 includes the first light source section 66 and the second light source section 62. The first light source section 66 includes the first light source module 661, the plurality of first heat receiving plates 664, and the first cooling plate 615. The first light source module 661 is equivalent to the light source module. The first light source module 661 includes the plurality of substrates 662 on which the light emitting elements 613 are disposed. The plurality of first heat receiving plates 664 are equivalent to the heat receiving plate and are coupled to the first light source module 661. The first cooling plate 615 is equivalent to the cooling plate and is coupled to the plurality of first heat receiving plates 664. The cooling liquid flows on the inside of the first cooling plate 615.

The first cooling plate 615 is coupled to each of the plurality of first heat receiving plates 614. The cooling liquid flows on the inside of the first cooling plate 615. The first cooling plate 615 includes the inflow section 6181, the outflow section 6182, the upstream-side flowing section 6185, the downstream-side flowing section 6186, and the plurality of heat transfer sections 617. The inflow section 6181 is provided in a part in the +Y direction (the first direction) extending along the end portion 618B. The cooling liquid flows into the inflow section 6181. The outflow section 6182 is provided in a part in the −Y direction with respect to the part in the +Y direction where the inflow section 6181 is provided at the end portion 618B. The cooling liquid flows out from the outflow section 6182. The cooling liquid having flowed in from the inflow section 6181 flows to the upstream-side flowing section 6185 in the +X direction (the second direction). The cooling liquid having flowed in the upstream-side flowing section 6185 flows to the downstream-side flowing section 6186 in the −X direction. The plurality of heat transfer sections 617 are provided in each of the upstream-side flowing section 6185 and the downstream-side flowing section 6186 and are disposed side by side in the +X direction.

The plurality of first heat receiving plates 664 include the upstream-side heat receiving plate 664A provided to correspond to the upstream-side flowing section 6185 and the downstream-side heat receiving plate 664B provided to correspond to the downstream-side flowing section 6186.

The plurality of substrates 662 include the plurality of upstream-side substrates 662A disposed side by side in the +X direction and coupled to the upstream-side heat receiving plate 664A and the plurality of downstream-side substrates 662B disposed side by side in the +X direction and coupled to the downstream-side heat receiving plate 664B. The plurality of heat transfer sections 617 are separated from each other between two light emitting elements 613 adjacent to each other in the +X direction among the plurality of light emitting elements 613. In other words, the plurality of heat transfer sections 617 are separated from each other in a position not overlapping the two light emitting elements 613 adjacent from each other in the +X direction among the plurality of light emitting elements 613 aligned in the +X direction.

With such a configuration, a pressure loss of the cooling liquid flowing in the first cooling plate 615 can be reduced. Accordingly, since it is possible to allow the cooling liquid to easily flow in the plurality of heat transfer sections 617, it is possible to increase a flow rate of the cooling liquid in the first cooling plate 615 without using a large pump. Therefore, it is possible to improve cooling efficiency by the first cooling plate 615 to which the heat of the first light source module 661 is transferred via the first heat receiving plate 664.

The position where the plurality of heat transfer sections 617 are separated from one another are the positions among the plurality of light emitting elements 613 aligned in the +X direction. Accordingly, the positions where the plurality of heat transfer sections 617 are separated from one another, that is, the gaps GP1 and GP2 can be located in positions where heat is less easily transferred from the plurality of light emitting elements 613 to the first cooling plate 615. In other words, since the heat transfer section 617 is disposed to correspond to the light emitting element 613, it is possible to make it easy to transfer heat of the plurality of light emitting elements 613 to the plurality of heat transfer sections 617. Therefore, it is possible to make it easy to transfer heat generated in the first light source module 661 to the plurality of heat transfer sections 617. It is possible to improve cooling efficiency of the first light source module 661.

Further, the heat of the plurality of upstream-side substrates 662A is transferred to the upstream-side flowing section 6185 via the upstream-side heat receiving plate 664A. The heat of the plurality of downstream-side substrates 662B is transferred to the downstream-side flowing section 6186 via the downstream-side heat receiving plate 664B. Accordingly, compared with when the heat of the plurality of upstream-side substrates 662A and the heat of the plurality of downstream-side substrates 662B are intensively transferred to one flowing section of the upstream-side flowing section 6185 and the downstream-side flowing section 6186, it is possible to make it easy to transfer heat generated in the first light source module 661 to the cooling liquid flowing in the upstream-side flowing section 6185 and the downstream-side flowing section 6186. Therefore, it is possible to further improve cooling efficiency of the first light source module 661.

Modifications of the Embodiments

The present disclosure is not limited to the embodiments explained above. Modifications, improvements, and the like within a range in which the object of the present disclosure can be attained are included in the present disclosure.

In the embodiments, the light source device 4 includes one of the first light source sections 61, 61A, 64, 64A, 65, and 66, the second light source section 62, and the light combining member 63. However, not only this, but the light source device according to the present disclosure may include the first light source section and may not include the second light source section and the light combining member. On the other hand, the light source device may include, in addition to the first light source section, the second light source section, and the light combining member, a third light source section having the same configuration as the configuration of one light source section of the first light source section and the second light source section. Further, at least one light source section among the plurality of light source sections included in the light source device may have the same configuration as the configuration of one of the first light source sections 61, 61A, 64, 64A, 65, and 66. The remaining light source sections may have the same configuration as the configuration of another one of the first light source sections 61, 61A, 64, 64A, 65, and 66.

In the embodiments, among the plurality of heat transfer sections 617, the number of the upstream-side heat transfer sections 617A disposed in the upstream-side flowing section 6185 is two or three and the number of the downstream-side heat transfer sections 617B disposed in the downstream-side flowing sections 6186 is two or three. However, the number of the upstream-side heat transfer sections 617A only has to be two or more and the number of the downstream-side heat transfer sections 617B only has to be two or more. The number of the substrates included in the light source module can be changed as appropriate. The number of the light emitting elements provided on the substrates can also be changed as appropriate. For example, four light emitting elements mounted on one substrate among the substrate 612 explained in the first embodiment, the substrate 612 explained in the modification of the first embodiment, and the substrate 662 explained in the fourth embodiment may be aligned in the +Y direction or the −Y direction. Alternatively, not only one or two but also four light emitting elements mounted on one substrate among the plurality of substrates 612, 642, and 662 explained in the embodiments may be aligned in the +X direction or the −X direction.

In the embodiments, the plurality of heat transfer sections 617 aligned in the +X direction are provided in each of the upstream-side flowing section 6185 and the downstream-side flowing section 6186. However, not only this, but the plurality of heat transfer sections 617 may be provided only in one flowing section of the upstream-side flowing section 6185 and the downstream-side flowing section 6186.

In the embodiments, the first cooling plates 615 and 655 and the second cooling plate 625 include the partition wall 6184 that partitions the space in the recess 6183 into the upstream-side flowing section 6185 and the downstream-side flowing section 6186. However, not only this, but the partition wall 6184 may be absent. For example, the cooling module may be formed in a U shape. An upstream portion in the internal space of the cooling module may be formed as the upstream-side flowing section and a downstream portion of the internal space may be formed as the downstream-side flowing section.

In the first embodiment, the two substrates 612 aligned in the +X direction are supported by the one first heat receiving plate 614. In the second embodiment, the one substrate 642 is supported by the two first heat receiving plates 644 or the two first heat receiving plates 644 and the one first heat receiving plate 644A. In the third embodiment, all of the substrates 642 are supported by the one first heat receiving plate 654. In the fourth embodiment, the six substrates 612 aligned in the +X direction are supported by the upstream-side heat receiving plate 664A or the downstream-side heat receiving plate 664B. However, not only this, but the number of the substrates supported by the one heat receiving plate can be changed as appropriate. The number of the heat receiving plates that support the one substrate can be changed as appropriate.

In the embodiments, the substrates 612, 642, and 662 on which the light emitting elements 613 are provided and the first heat receiving plates 614, 644, 654, and 664 are disposed to correspond to each of the upstream-side flowing section 6185 and the downstream-side flowing section 6186. However, not only this, but the substrates and the heat receiving plates may be provided to correspond to one flowing section of the upstream-side flowing section 6185 and the downstream-side flowing section 6186.

In the embodiments, the light source device 4 has the configuration and the layout shown in FIG. 2. However, not only this, but the components and the layouts included in the light source device according to the present disclosure are not limited to the examples explained above. The same applies to the projector including the light source device according to the present disclosure.

In the embodiments, the image forming device 34 includes the three light modulation devices 343B, 343G, and 343R. However, not only this but the present disclosure can also be applied to a projector including an image forming device including two or less or four or more light modulation devices.

In the embodiments, the light modulation devices 343 include the transmission-type liquid crystal panel, the light incident surface and the light emission surface of which are different. However, not only this, but the light modulation device including the projector according to the present disclosure may include a reflection-type liquid crystal panel, a light incident surface and a light emission surface of which are the same. A light modulation device other than the liquid crystal such as a device including a micromirror such as a DMD (Digital Micromirror Device) may be used in the projector if the light modulation device is capable of modulating an incident light beam and forming an image corresponding to image information.

In the embodiments, an example is explained in which the light source device according to the present disclosure is applied to the projector. However, not only this, but the light source device according to the present disclosure may be applied to electronic equipment other than the projector, for example, an illumination device or a headlight of an automobile or the like.

In the embodiments, the cooling plate is used to cool the light emitting elements provided on the substrates. However, not only this, but the cooling plate according to the present disclosure may be used to cool other cooling targets.

Overview of the Present Disclosure

An overview of the present disclosure is noted below.

A light source device according to a first aspect of the present disclosure includes: a light source module including a plurality of substrates on which light emitting elements are disposed; a plurality of heat receiving plates coupled to the light source module; and a cooling plate coupled to each of the plurality of heat receiving plates, cooling liquid flowing on an inside of the cooling plate. The cooling plate includes: an inflow section provided in a part in a first direction extending along an end portion, the cooling liquid flowing into the inflow section; an outflow section provided in a part in an opposite direction of the first direction with respect to the part, the cooling liquid flowing out from the outflow section; an upstream-side flowing section in which the cooling liquid having flowed in from the inflow section flows in a second direction orthogonal to the first direction; a downstream-side flowing section in which the cooling liquid having flowed in the upstream-side flowing section flows in an opposite direction of the second direction; and a plurality of heat transfer sections provided in at least one flowing section of the upstream-side flowing section and the downstream-side flowing section and disposed side by side in the second direction. The plurality of heat transfer sections include: a plurality of fins extending along the second direction and arrayed along the first direction; and a plurality of channels provided among the plurality of fins, the cooling liquid flowing in the plurality of channels. The plurality of heat receiving plates are disposed along the second direction to correspond to the at least one flowing section. The plurality of heat transfer sections are separated from one another in positions corresponding to positions among the plurality of heat receiving plates in the second direction.

With such a configuration, compared with when one heat transfer section corresponding to the length of the plurality of heat transfer sections in the second direction is provided, since the channels of the cooling liquid in the heat transfer sections can be reduced in length, a pressure loss of the cooling liquid can be reduced. Consequently, since it is possible to allow the cooling liquid to easily flow in the plurality of heat transfer sections, it is possible to increase a flow rate of the cooling liquid in the cooling plate without using a large pump. Therefore, it is possible to improve cooling efficiency by the cooling plate to which the heat of the light source module is transferred via the heat receiving plates.

The positions where the plurality of heat transfer sections are separated from one another are the positions among the plurality of heat receiving plates aligned in the second direction. Accordingly, the positions where the plurality of heat transfer sections are separated from one another can be located in positions where heat is less easily transferred from the plurality of heat receiving plates to the cooling plate. In other words, it is possible to make it easy to transfer heat from the plurality of heat receiving plates to the plurality of heat transfer sections. Therefore, it is possible to make it easy to transfer heat generated in the light source module to the plurality of heat transfer sections. The plurality of heat transfer sections transfer the heat to the cooling liquid, whereby it is possible to improve cooling efficiency of the light source module.

In the first aspect, the cooling plate may include a partition wall that extends in the second direction and partitions a space on an inside of the cooling plate into the upstream-side flowing section and the downstream-side flowing section.

With such a configuration, compared with when the upstream-side flowing section and the downstream-side flowing section are respectively surrounded by different outer walls, it is possible to reduce the distance in the first direction between the upstream-side flowing section and the downstream-side flowing section. Therefore, it is possible to reduce the cooling plate in size.

In the first aspect, the plurality of heat transfer sections may be provided in each of the upstream-side flowing section and the downstream-side flowing section.

With such a configuration, a pressure loss of the cooling liquid can be reduced in each of the upstream-side flowing section and the downstream-side flowing section. Therefore, it is possible to improve, without using a large pump, cooling efficiency by the cooling plate to which the heat of the light source module is transferred via the heat receiving plates.

In each of the upstream-side flowing section and the downstream-side flowing section, it is possible to make it easy to transfer the heat generated in the light source module to the plurality of heat transfer sections. Therefore, the plurality of heat transfer sections transfer the heat to the cooling liquid, whereby it is possible to improve the cooling efficiency of the light source module.

In the first aspect, the plurality of heat receiving plates may include: an upstream-side heat receiving plate disposed to correspond to the upstream-side flowing section; and a downstream-side heat receiving plate disposed to correspond to the downstream-side flowing section.

With such a configuration, the heat of the substrates on which the light emitting elements are disposed can be transferred to, by the upstream-side heat receiving plate, at least one heat transfer section among the plurality of heat transfer sections disposed in the upstream-side flowing section. Similarly, the heat of the substrates on which the light emitting elements are disposed can be transferred to, by the downstream-side heat receiving plate, at least one heat transfer section among the plurality of heat transfer sections disposed in the downstream-side flowing section. Consequently, it is possible to make it easily transfer, with the heat transfer section disposed in the upstream-side flowing section and the heat transfer section disposed in the downstream-side flowing section, the heat generated in the light source module to the cooling liquid flowing in each of the upstream-side flowing section and the downstream-side flowing section. Therefore, it is possible to improve the cooling efficiency of the light source module.

In the first aspect, the plurality of substrates may be disposed side by side in the second direction, and the plurality of heat receiving plates may be disposed side by side in the second direction and coupled to an end portion in the second direction of the substrate corresponding thereto among the plurality of substrates.

With such a configuration, heat generated in the substrate is transferred to the cooling plate via the heat receiving plate coupled to the end portion of the substrate. Since the plurality of heat transfer sections are separated from one another among the plurality of heat receiving plates in the second direction, the heat transfer sections are present in coupling parts of the cooling plate and the heat receiving plates. Therefore, the heat generated in the substrate can be transferred to the heat transfer section via the heat receiving plate. Therefore, it is possible to improve cooling efficiency of the light source module including the plurality of substrates.

In the first aspect, the plurality of heat transfer sections may be separated from one another in positions not overlapping the light emitting elements.

With such a configuration, even if the plurality of heat transfer sections are separated in the positions not overlapping the light emitting elements provided on the substrates, the heat of the substrates can be transferred to the plurality of heat transfer sections via the plurality of heat receiving plates. Accordingly, it is possible to make it easy to optionally set the number of the light emitting elements disposed on the substrates. Besides, it is possible to improve layout flexibility of the light emitting elements on the substrates. Therefore, it is possible to improve design flexibility of the light source module.

A light source device according to a second aspect of the present disclosure includes: a light source module including a plurality of substrates on which light emitting elements are disposed; one heat receiving plate coupled to the light source module; and a cooling plate coupled to the heat receiving plate, cooling liquid flowing on an inside of the cooling plate. The cooling plate includes: an inflow section provided in a part in a first direction extending along an end portion, the cooling liquid flowing into the inflow section; an outflow section provided in a part in an opposite direction of the first direction with respect to the part, the cooling liquid flowing out from the outflow section; an upstream-side flowing section in which the cooling liquid having flowed in from the inflow section flows in a second direction orthogonal to the first direction; a downstream-side flowing section in which the cooling liquid having flowed in the upstream-side flowing section flows in an opposite direction of the second direction; and a plurality of heat transfer sections provided in at least one flowing section of the upstream-side flowing section and the downstream-side flowing section and disposed side by side in the second direction. The plurality of heat transfer sections include: a plurality of fins extending along the second direction and arrayed along the first direction; and a plurality of channels provided among the plurality of fins, the cooling liquid flowing in the plurality of channels. The plurality of substrates are disposed side by side in the second direction. The plurality of heat transfer sections are separated from each other in a position corresponding to a position between two light emitting elements among a plurality of the light emitting elements aligned in the second direction.

With such a configuration, it is possible to achieve the same effects as the effects of the light source device according to the first embodiment explained above.

That is, compared with when one heat transfer section corresponding to the length of the plurality of heat transfer sections in the second direction is provided, since the channels of the cooling liquid in the heat transfer sections can be reduced in length, a pressure loss of the cooling liquid can be reduced. Consequently, since it is possible to allow the cooling liquid to easily flow in the plurality of heat transfer sections, it is possible to increase a flow rate of the cooling liquid in the cooling plate without using a large pump. It is possible to improve cooling efficiency by the cooling plate to which the heat of the light source module is transferred via the heat receiving plates.

The positions where the plurality of heat transfer sections are separated from one another are the positions among the plurality of light emitting elements aligned in the second direction. Accordingly, the positions where the plurality of heat transfer sections are separated from one another can be located in positions where heat is less easily transferred from the plurality of light emitting elements to the cooling plate. In other words, since the heat transfer sections are disposed to correspond to the light emitting elements, it is possible to make it easy to transfer heat of the light emitting elements to the plurality of heat transfer sections. Therefore, it is possible to make it easy to transfer heat generated in the light source module to the plurality of heat transfer sections. The plurality of heat transfer sections transfer the heat to the cooling liquid, whereby it is possible to improve the cooling efficiency of the light source module.

A light source device according to a third aspect of the present disclosure includes: a light source module including a plurality of substrates on which light emitting elements are disposed; a plurality of heat receiving plates coupled to the light source module; and a cooling plate coupled to each of the plurality of heat receiving plates, cooling liquid flowing on an inside of the cooling plate. The cooling plate includes: an inflow section provided in a part in a first direction extending along an end portion, the cooling liquid flowing into the inflow section; an outflow section provided in a part in an opposite direction of the first direction with respect to the part, the cooling liquid flowing out from the outflow section; an upstream-side flowing section in which the cooling liquid having flowed in from the inflow section flows in a second direction orthogonal to the first direction; a downstream-side flowing section in which the cooling liquid having flowed in the upstream-side flowing section flows in an opposite direction of the second direction; and a plurality of heat transfer sections provided in at least one flowing section of the upstream-side flowing section and the downstream-side flowing section and provided along the second direction. The plurality of heat transfer sections include: a plurality of fins extending along the second direction and arrayed along the first direction; and a plurality of channels provided among the plurality of fins, the cooling liquid flowing in the plurality of channels. The plurality of substrates are disposed side by side in the second direction. The plurality of heat receiving plates include: an upstream-side heat receiving plate provided to correspond to the upstream-side flowing section; and a downstream-side heat receiving plate provided to correspond to the downstream-side flowing section. The plurality of substrates include: a plurality of upstream-side substrates disposed side by side in the second direction and coupled to the upstream-side heat receiving plate; and a plurality of downstream-side substrates disposed side by side in the second direction and coupled to the downstream-side heat receiving plate. The plurality of heat transfer sections are separated from each other in a position corresponding to a position between two light emitting elements among a plurality of the light emitting elements aligned in the second direction.

With such a configuration, it is possible to achieve the same effects as the effects of the light source devices according to the first and second aspects explained above.

That is, compared with when one heat transfer section corresponding to the length of the plurality of heat transfer sections in the second direction is provided, since the channels of the cooling liquid in the heat transfer sections can be reduced in length, a pressure loss of the cooling liquid can be reduced. Consequently, since it is possible to allow the cooling liquid to easily flow in the plurality of heat transfer sections, it is possible to increase a flow rate of the cooling liquid in the cooling plate without using a large pump. It is possible to improve cooling efficiency by the cooling plate to which the heat of the light source module is transferred via the heat receiving plates.

The positions where the plurality of heat transfer sections are separated from one another are the positions among the plurality of light emitting elements aligned in the second direction. Accordingly, the positions where the plurality of heat transfer sections are separated from one another can be located in positions where heat is less easily transferred from the plurality of light emitting elements to the cooling plate. In other words, since the heat transfer sections are disposed to correspond to the light emitting elements, it is possible to make it easy to transfer heat of the light emitting elements to the plurality of heat transfer sections. Therefore, it is possible to make it easy to transfer heat generated in the light source module to the plurality of heat transfer sections. The plurality of heat transfer sections transfer the heat to the cooling liquid, whereby it is possible to improve the cooling efficiency of the light source module.

Further, the heat of the plurality of upstream-side substrates is transferred to the upstream-side flowing section via the upstream-side heat receiving plates. The heat of the plurality of downstream-side substrates is transferred to the downstream-side flowing section via the downstream-side heat receiving plate. Accordingly, compared with when the heat of the plurality of upstream-side substrates and the heat of the plurality of downstream-side substrates are intensively transferred to one flowing section of the upstream-side flowing section and the downstream-side flowing section, it is possible to make it easy to transfer heat generated in the light source module to the cooling liquid flowing in the upstream-side flowing section and the downstream-side flowing section. Therefore, it is possible to further improve cooling efficiency of the light source module.

In the second and third aspects, the cooling plate may include a partition wall that extends in the second direction and partitions a space on an inside of the cooling plate into the upstream-side flowing section and the downstream-side flowing section.

With such a configuration, as explained above, compared with when the upstream-side flowing section and the downstream-side flowing section are respectively surrounded by different outer walls, it is possible to reduce the distance in the first direction between the upstream-side flowing section and the downstream-side flowing section. Therefore, it is possible to reduce the cooling plate in size.

In the second and third aspects, the plurality of heat transfer sections may be provided in each of the upstream-side flowing section and the downstream-side flowing section.

With such a configuration, as explained above, a pressure loss of the cooling liquid can be reduced in each of the upstream-side flowing section and the downstream-side flowing section. Therefore, it is possible to improve, without using a large pump, cooling efficiency by the cooling plate to which the heat of the light source module is transferred via the heat receiving plates. In each of the upstream-side flowing section and the downstream-side flowing section, it is possible to make it easy to transfer the heat generated in the light source module to the plurality of heat transfer sections. Therefore, the plurality of heat transfer sections transfer the heat to the cooling liquid, whereby it is possible to improve the cooling efficiency of the light source module.

A projector according to a fourth aspect of the present disclosure includes: the light source device according to the first to third aspects; an image forming device configured to modulate light emitted from the light source device to form image light; and a projection optical device configured to project the image light formed by the image forming device.

With such a configuration, it is possible to achieve the same effects as the effects of the light source devices according to the first to third aspects. It is possible to achieve a reduction in the size of the projector. Since cooling efficiency of the light source module is improved, it is possible to make it easy to increase a light amount of light emitted from the light source module. Therefore, it is possible to increase the luminance of a projected image.

A cooling plate according to a fifth aspect of the present disclosure is a cooling plate, on an inside of which cooling liquid flows, the cooling plate including: an inflow section provided in a part in a first direction extending along an end portion, the cooling liquid flowing into the inflow section; an outflow section provided in a part in an opposite direction of the first direction with respect to the part, the cooling liquid flowing out from the outflow section; an upstream-side flowing section in which the cooling liquid having flowed in from the inflow section flows in a second direction orthogonal to the first direction; a downstream-side flowing section in which the cooling liquid having flowed in the upstream-side flowing section flows in an opposite direction of the second direction; and a plurality of heat transfer sections provided in at least one flowing section of the upstream-side flowing section and the downstream-side flowing section and disposed side by side in the second direction. The plurality of heat transfer sections include: a plurality of fins extending along the second direction and arrayed along the first direction; and a plurality of channels provided among the plurality of fins, the cooling liquid flowing in the plurality of channels. The plurality of heat transfer sections are separated from one another in the second direction.

With such a configuration, compared with when one heat transfer section corresponding to the length of the plurality of heat transfer sections in the second direction is provided, since the channels of the cooling liquid in the heat transfer sections can be reduced in length, a pressure loss of the cooling liquid can be reduced. Consequently, since it is possible to allow the cooling liquid to easily flow in the plurality of heat transfer sections, it is possible to increase a flow rate of the cooling liquid in the cooling plate without using a large pump. It is possible to improve cooling efficiency by the cooling plate.

What is claimed is:
1. A light source device comprising:
a light source module including a plurality of substrates on which light emitting elements are disposed;
a plurality of heat receiving plates coupled to the light source module; and
a cooling plate coupled to each of the plurality of heat receiving plates, cooling liquid flowing on an inside of the cooling plate, wherein
the cooling plate includes:
an inflow section provided in a part in a first direction extending along an end portion, the cooling liquid flowing into the inflow section;
an outflow section provided in a part in an opposite direction of the first direction with respect to the part, the cooling liquid flowing out from the outflow section;
an upstream-side flowing section in which the cooling liquid having flowed in from the inflow section flows in a second direction orthogonal to the first direction;

a downstream-side flowing section in which the cooling liquid having flowed in the upstream-side flowing section flows in an opposite direction of the second direction; and
a plurality of heat transfer sections provided in at least one flowing section of the upstream-side flowing section and the downstream-side flowing section and disposed side by side in the second direction,
the plurality of heat transfer sections include:
a plurality of fins extending along the second direction and arrayed along the first direction; and
a plurality of channels provided among the plurality of fins, the cooling liquid flowing in the plurality of channels,
the plurality of heat receiving plates are disposed along the second direction to correspond to the at least one flowing section, and
the plurality of heat transfer sections are separated from one another in positions corresponding to positions among the plurality of heat receiving plates in the second direction.

2. The light source device according to claim 1, wherein the cooling plate includes a partition wall that extends in the second direction and partitions a space on an inside of the cooling plate into the upstream-side flowing section and the downstream-side flowing section.

3. The light source device according to claim 1, wherein the plurality of heat transfer sections are provided in each of the upstream-side flowing section and the downstream-side flowing section.

4. The light source device according to claim 3, wherein the plurality of heat receiving plates include:
an upstream-side heat receiving plate disposed to correspond to the upstream-side flowing section; and
a downstream-side heat receiving plate disposed to correspond to the downstream-side flowing section.

5. The light source device according to claim 3, wherein the plurality of substrates are disposed side by side in the second direction, and
the plurality of heat receiving plates are disposed side by side in the second direction and coupled to an end portion in the second direction of the substrate corresponding thereto among the plurality of substrates.

6. The light source device according to claim 5, wherein the plurality of heat transfer sections are separated from one another in positions not overlapping the light emitting elements.

7. A projector comprising:
the light source device according to claim 1;
an image forming device configured to modulate light emitted from the light source device to form image light; and
a projection optical device configured to project the image light formed by the image forming device.

8. A light source device comprising:
a light source module including a plurality of substrates on which light emitting elements are disposed;
one heat receiving plate coupled to the light source module; and
a cooling plate coupled to the heat receiving plate, cooling liquid flowing on an inside of the cooling plate, wherein
the cooling plate includes:
an inflow section provided in a part in a first direction extending along an end portion, the cooling liquid flowing into the inflow section;
an outflow section provided in a part in an opposite direction of the first direction with respect to the part, the cooling liquid flowing out from the outflow section;
an upstream-side flowing section in which the cooling liquid having flowed in from the inflow section flows in a second direction orthogonal to the first direction;
a downstream-side flowing section in which the cooling liquid having flowed in the upstream-side flowing section flows in an opposite direction of the second direction; and
a plurality of heat transfer sections provided in at least one flowing section of the upstream-side flowing section and the downstream-side flowing section and disposed side by side in the second direction,
the plurality of heat transfer sections include:
a plurality of fins extending along the second direction and arrayed along the first direction; and
a plurality of channels provided among the plurality of fins, the cooling liquid flowing in the plurality of channels,
the plurality of substrates are disposed side by side in the second direction, and
the plurality of heat transfer sections are separated from each other in a position corresponding to a position between two light emitting elements among a plurality of the light emitting elements aligned in the second direction.

9. The light source device according to claim 8, wherein the cooling plate includes a partition wall that extends in the second direction and partitions a space on an inside of the cooling plate into the upstream-side flowing section and the downstream-side flowing section.

10. The light source device according to claim 8, wherein the plurality of heat transfer sections are provided in each of the upstream-side flowing section and the downstream-side flowing section.

11. A projector comprising:
the light source device according to claim 8;
an image forming device configured to modulate light emitted from the light source device to form image light; and
a projection optical device configured to project the image light formed by the image forming device.

12. A light source device comprising:
a light source module including a plurality of substrates on which light emitting elements are disposed;
a plurality of heat receiving plates coupled to the light source module; and
a cooling plate coupled to each of the plurality of heat receiving plates, cooling liquid flowing on an inside of the cooling plate, wherein
the cooling plate includes:
an inflow section provided in a part in a first direction extending along an end portion, the cooling liquid flowing into the inflow section;
an outflow section provided in a part in an opposite direction of the first direction with respect to the part, the cooling liquid flowing out from the outflow section;
an upstream-side flowing section in which the cooling liquid having flowed in from the inflow section flows in a second direction orthogonal to the first direction;
a downstream-side flowing section in which the cooling liquid having flowed in the upstream-side flowing section flows in an opposite direction of the second direction; and a plurality of heat transfer sections provided in at least one flowing section of the upstream-side flowing section and the downstream-side flowing section and provided along the second direction, the plurality of heat transfer sections include:
a plurality of fins extending along the second direction and arrayed along the first direction; and
a plurality of channels provided among the plurality of fins, the cooling liquid flowing in the plurality of channels, the plurality of substrates are disposed side by side in the second direction, the plurality of heat receiving plates include:
an upstream-side heat receiving plate provided to correspond to the upstream-side flowing section; and
a downstream-side heat receiving plate provided to correspond to the downstream-side flowing section, the plurality of substrates include:
a plurality of upstream-side substrates disposed side by side in the second direction and coupled to the upstream-side heat receiving plate; and
a plurality of downstream-side substrates disposed side by side in the second direction and coupled to the downstream-side heat receiving plate, and the plurality of heat transfer sections are separated from each other in a position corresponding to a position between two light emitting elements among a plurality of the light emitting elements aligned in the second direction.

13. The light source device according to claim 12, wherein the cooling plate includes a partition wall that extends in the second direction and partitions a space on an inside of the cooling plate into the upstream-side flowing section and the downstream-side flowing section.

14. The light source device according to claim 12, wherein the plurality of heat transfer sections are provided in each of the upstream-side flowing section and the downstream-side flowing section.

15. A projector comprising:
the light source device according to claim 12;
an image forming device configured to modulate light emitted from the light source device to form image light; and
a projection optical device configured to project the image light formed by the image forming device.

16. A cooling plate, on an inside of which cooling liquid flows, the cooling plate comprising:
an inflow section provided in a part in a first direction extending along an end portion, the cooling liquid flowing into the inflow section;
an outflow section provided in a part in an opposite direction of the first direction with respect to the part, the cooling liquid flowing out from the outflow section;
an upstream-side flowing section in which the cooling liquid having flowed in from the inflow section flows in a second direction orthogonal to the first direction;
a downstream-side flowing section in which the cooling liquid having flowed in the upstream-side flowing section flows in an opposite direction of the second direction; and
a plurality of heat transfer sections provided in at least one flowing section of the upstream-side flowing section and the downstream-side flowing section and disposed side by side in the second direction, wherein the plurality of heat transfer sections include:
a plurality of fins extending along the second direction and arrayed along the first direction; and
a plurality of channels provided among the plurality of fins, the cooling liquid flowing in the plurality of channels, and the plurality of heat transfer sections are separated from one another in the second direction.

* * * * *